US011612034B2

United States Patent
Ichikawa et al.

(10) Patent No.: US 11,612,034 B2
(45) Date of Patent: Mar. 21, 2023

(54) AUTOMOTIVE LAMP

(71) Applicant: KOITO MANUFACTURING CO., LTD., Tokyo (JP)

(72) Inventors: Tomoyuki Ichikawa, Shizuoka (JP); Satoshi Kikuchi, Shizuoka (JP); Ryosuke Matsuhana, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/064,695

(22) Filed: Oct. 7, 2020

(65) Prior Publication Data

US 2021/0016706 A1   Jan. 21, 2021

Related U.S. Application Data

(63) Continuation of application No. PCT/JP2019/014888, filed on Apr. 3, 2019.

(30) Foreign Application Priority Data

Apr. 10, 2018 (JP) .............................. JP2018-075581
Apr. 16, 2018 (JP) .............................. JP2018-078332

(51) Int. Cl.
   *H05B 45/375* (2020.01)
   *H05B 45/44* (2020.01)
   (Continued)

(52) U.S. Cl.
   CPC ......... *H05B 45/375* (2020.01); *B60Q 1/1407* (2013.01); *B60Q 1/1423* (2013.01);
   (Continued)

(58) Field of Classification Search
   CPC ...... H05B 45/375; H05B 45/52; H05B 45/56; H05B 45/34; H05B 45/44; H05B 47/17;
   (Continued)

(56) References Cited

U.S. PATENT DOCUMENTS

2007/0195025 A1 * 8/2007 Korcharz ............... H05B 45/46
                                                                 345/82
2009/0009088 A1   1/2009 Ito et al.
(Continued)

FOREIGN PATENT DOCUMENTS

CN   101069339 A   11/2007
CN   102869155 A   1/2013
(Continued)

OTHER PUBLICATIONS

International Search Report (Form PCT/ISA/210) dated Jun. 18, 2019, in International Application No. PCT/JP2019/014888. (4 pages).

(Continued)

*Primary Examiner* — Renan Luque

(74) *Attorney, Agent, or Firm* — Buchanan Ingersoll & Rooney PC

(57) ABSTRACT

A lighting circuit turns on multiple semiconductor light sources. Multiple current sources are each coupled in series with a corresponding one from among the semiconductor light sources. A switching converter supplies a driving voltage $V_{OUT}$ across each of multiple series connection circuits formed of the multiple semiconductor light sources and the multiple current sources. A converter controller controls a switching transistor of the switching converter based on a relation between a voltage across one from among the multiple current sources and a reference voltage having a positive correlation with the temperature $T_j$.

13 Claims, 33 Drawing Sheets

(51) Int. Cl.
*H05B 45/52* (2020.01)
*F21S 41/663* (2018.01)
*F21S 41/141* (2018.01)
*H05B 45/34* (2020.01)
*B60Q 1/14* (2006.01)
*B60Q 11/00* (2006.01)
*H05B 45/56* (2020.01)
*F21Y 115/10* (2016.01)
*F21W 102/135* (2018.01)
*F21S 41/151* (2018.01)
*H05B 47/17* (2020.01)

(52) U.S. Cl.
CPC .......... *B60Q 11/005* (2013.01); *F21S 41/141* (2018.01); *F21S 41/663* (2018.01); *H05B 45/34* (2020.01); *H05B 45/44* (2020.01); *H05B 45/52* (2020.01); *H05B 45/56* (2020.01); *B60Q 2300/05* (2013.01); *F21S 41/151* (2018.01); *F21W 2102/135* (2018.01); *F21Y 2115/10* (2016.08); *H05B 47/17* (2020.01)

(58) Field of Classification Search
CPC ...... H05B 45/46; F21S 41/663; F21S 41/141; F21S 41/151; B60Q 1/1407; B60Q 1/1423; B60Q 11/005; B60Q 2300/05; F21Y 2115/10; F21W 2102/135
See application file for complete search history.

(56) References Cited

U.S. PATENT DOCUMENTS

| | | | | |
|---|---|---|---|---|
| 2010/0219773 | A1* | 9/2010 | Nakai | H05B 45/46 315/307 |
| 2011/0109231 | A1* | 5/2011 | Shiu | H05B 45/24 315/122 |
| 2011/0109243 | A1* | 5/2011 | Kim | H05B 45/395 315/294 |
| 2013/0038212 | A1* | 2/2013 | Yabuta | G02F 1/133611 315/297 |
| 2013/0038819 | A1* | 2/2013 | Ishikawa | H05B 45/46 349/69 |
| 2013/0062936 | A1 | 3/2013 | Aragai | |
| 2014/0167630 | A1 | 6/2014 | Lin | |
| 2014/0354188 | A1 | 12/2014 | Takahashi et al. | |
| 2015/0032329 | A1 | 1/2015 | Suzuki | |
| 2015/0211703 | A1 | 7/2015 | Nakazawa et al. | |
| 2016/0381748 | A1 | 12/2016 | Hagino | |
| 2017/0359868 | A1 | 12/2017 | Kim | |
| 2018/0317292 | A1* | 11/2018 | Katsura | H05B 45/38 |
| 2021/0378070 | A1 | 12/2021 | Ichikawa et al. | |

FOREIGN PATENT DOCUMENTS

| | | |
|---|---|---|
| EP | 2244537 A2 | 10/2010 |
| JP | 2007-200828 A | 8/2007 |
| JP | 2009-012669 A | 1/2009 |
| JP | 2010177531 A | 8/2010 |
| JP | 2014-236302 A | 12/2014 |
| JP | 2015-138763 A | 7/2015 |
| JP | 2016029665 A | 3/2016 |
| JP | 2017-010810 A | 1/2017 |
| JP | 2018019025 A | 2/2018 |

OTHER PUBLICATIONS

International Preliminary Report on Patentability (Form PCT/IB/373) and the Written Opinion of the International Searching Authority (Form PCT/ISA/237) dated Oct. 13, 2020, in International Application No. PCT/JP2019/014888. (14 pages).
Official Action issued in corresponding U.S. Appl. No. 17/402,941, dated Mar. 3, 2022 (17 pages).
First Office Action dated May 13, 2022, issued in the corresponding Chinese Patent Application No. 201980024536.7, 19 pages including 11 pages of English Translation.
Official Action issued in corresponding U.S. Appl. No. 17/402,941, dated Aug. 17, 2022 (21 pages).
Notification of Reasons for Refusal issued in corresponding Japanese Patent Application No. 2020-513228, dated Sep. 6, 2022, with English Translation (7 pages).

* cited by examiner

AUTOMOTIVE LAMP

BACKGROUND

1. Technical Field

The present disclosure relates to a lighting circuit.

2. Description of the Related Art

Typical automotive lamps are capable of switching between a low-beam mode and a high-beam mode. The low-beam mode is used to illuminate a close range in the vicinity of the user's vehicle with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or a driver of a vehicle ahead of the vehicle.

In recent years, the Adaptive Driving Beam (ADB) technique has been proposed in which a high-beam distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and the illumination is reduced or turned off for a region that corresponds to such a vehicle or pedestrian thus detected, thereby reducing glare imparted to such a vehicle or pedestrian.

FIG. 1 is a block diagram showing a lamp system 1001 having an ADB function. The lamp system 1001 includes a battery 1002, a switch 1004, a switching converter 1006, multiple light-emitting units 1008_1 through 1008_N, multiple current sources 1010_1 through 1010_N, a converter controller 1012, and a light distribution controller 1014.

The multiple light-emitting units 1008_1 through 1008_N are each configured as a semiconductor light source such as a light-emitting diode (LED), laser diode (LD), or the like, which are associated with multiple different regions on a virtual vertical screen ahead of the vehicle. The multiple current sources 1010_1 through 1010_N are arranged in series with the multiple corresponding light-emitting units 1008_1 through 1008_N. A driving current $I_{LEDi}$ generated by the current source 1010_i flows through the i-th ($1 \le i \le N$) light-emitting unit 1008_i.

The multiple current sources 1010_1 through 1010_N are each configured to be capable of turning on and off (or adjusting the amount of current) independently. The light distribution controller 1014 controls the on/off state (or the amount of current) for each of the multiple current sources 1010_1 through 1010_N so as to provide a desired light distribution pattern.

The switching converter 1006 configured to provide a constant voltage output generates a driving voltage $V_{OUT}$ that is sufficient for the multiple light-emitting units 1008_1 through 1008_N to provide light emission with a desired luminance. Description will be made directing attention to the i-th channel. When a given driving current $I_{LEDi}$ flows through the light-emitting unit 1008_i, a voltage drop (forward voltage) $V_{Fi}$ occurs in the light-emitting unit 1008_i. In order to allow the current source 1010_i to generate the driving current $i_{LEDi}$, the voltage across the current source 1010_i is required to be larger than a particular voltage (which will be referred to as "saturation voltage $V_{SATi}$" hereafter). Accordingly, the following inequality expression must hold true for the i-th channel.

$$V_{OUT} > V_{Fi} + V_{SATi} \quad (1)$$

This relation must hold true for all the channels.

Problem 1

In order to satisfy the inequality expression (1) in all situations, the output voltage $V_{OUT}$ may preferably be employed as the control target for the feedback control. Specifically, as represented by Expression (2), a target value $V_{OUT(REF)}$ of the output voltage $V_{OUT}$ is set to a higher value giving consideration to a margin. Furthermore, the output voltage $V_{OUT}$ may preferably be feedback controlled such that the output voltage $V_{OUT}$ of the switching converter 1006 matches the target value $V_{OUT(REF)}$.

$$V_{OUT(REF)} = V_{F(MARGIN)} + V_{SAT(MARGIN)} \quad (2)$$

Here, $V_{F(TYP)}$ represents the maximum value (or typical value) of $V_F$ with a margin added. $V_{SAT(MARGIN)}$ represents a saturation voltage $V_{SAT}$ with a margin added.

In this control operation, the difference between the saturation voltage $V_{SAT(MARGIN)}$ and the actual saturation voltage $V_{SAT}$ is applied to the current source 1010, which leads to the occurrence of unnecessary power loss. In addition, when the actual forward voltage $V_F$ is lower than $V_{F(MARGIN)}$, voltage drop that occurs across the current source 1010 includes the voltage difference between them, leading to the occurrence of unnecessary power loss.

With an automotive lamp, there is a need to flow a very large current through a light-emitting unit. Furthermore, it is more difficult to provide such an automotive lamp with countermeasures for releasing heat than it is for other devices. Accordingly, with the automotive lamp, there is a demand to reduce the heat amount due to the current source as much as possible.

Problem 2

The spatial resolution of the light distribution pattern generated by the lamp system 1001 is determined by the number N of the light-emitting units 1008. With a lamp system that supports high spatial resolution in which the number N exceeds several hundred, such a system has a problem of an increased number of lines that couple elements or circuits. As an example, in a case in which such light-emitting units are arranged in the form of a matrix with 30 pixels in the vertical direction and 30 pixels in the horizontal direction, the light distribution controller 1014 and the multiple light-emitting units 1008 are coupled via N (=900) signal lines, which is unrealistic.

FIG. 22 is a diagram showing another example configuration of the lamp system 1001. The multiple current sources 1010_1 through 1010_N are integrated on a single semiconductor chip (driving IC) 1020. An interface/decoder circuit 1022 is mounted on the driving IC 1020. Furthermore, control signals for the N current sources 1010_1 through 1010_N are transmitted in a time-sharing manner. This allows the number of lines that couple the driving IC 1020 and the light distribution controller 1014 to be reduced. In a case in which high-speed serial communication is employed, such an arrangement requires only several lines.

By investigating the lamp system 1001 shown in FIG. 22, the present inventor has recognized the following problem.

With the lamp system shown in FIG. 1, when an abnormal state has occurred in a line between a current source 1010 and the light distribution controller 1014, this leads to the occurrence of an out-of-control state in the light-emitting unit 1008 that corresponds to the line. However, there is a low probability of the occurrence of an abnormal state in all N lines. Accordingly, in actuality, this does not immediately lead to a state in which the vehicle cannot be driven.

In contrast, with the lamp system shown in FIG. 22, all the light-emitting units 1008 are controlled via several lines 1030. Accordingly, even when only a single line 1030 comes to be in an abnormal state, this leads to the occurrence of an out-of-control state in all the light-emitting elements 1008. This leads to a situation in which an oncoming vehicle or a leading vehicle is disturbed, or a situation in which a necessary area cannot be illuminated.

The same problem can occur in other kinds of lamps. FIG. 23 is another example configuration of an automotive lamp. An automotive lamp 2001 includes a lamp ECU 2002, an interface 2010, a local controller 2020, a variable light distribution device 2030, a light source 2040, and a lighting circuit 2050.

The lighting circuit 2050 turns on the light source 2040. The variable light distribution device 2030 includes multiple independently controllable elements. A light distribution pattern is generated according to the state of the multiple controllable elements. For example, the variable light distribution device 2030 is configured as a Digital Mirror Device (DMD) configured to reflect the output light of the light source 2040. The variable light distribution device 2030 is configured such that a reflection on/off state is controllable for each pixel.

Alternatively, in a case in which the automotive lamp 2001 employs a bypass method, the light source 2040 includes multiple LEDs coupled in series. The variable light distribution device 2030 includes multiple bypass switches respectively coupled in parallel with the multiple LEDs. The light distribution pattern is generated according to the on/off states of the multiple bypass switches.

In a case in which the variable light distribution device 2030 and the local controller 2020 are mounted on a circuit board 2006 that is separate from that on which the lamp ECU 2002 is mounted, the lamp ECU 2002 and the local controller 2020 are coupled via a communication line 2004 instead of wiring provided on a printed circuit board. The circuit board 2006 includes the interface circuit 2010 that receives a control signal S1 from the lamp ECU 2002.

The local controller 2020 converts the control signal S1 received by the interface circuit 2010 into individual control signals S2 for indicating the states of the multiple controllable elements included in the variable light distribution device 2030.

In this case, when an abnormal state has occurred in the communication line 2004, the connector, the lamp ECU 2002, or the communication line 5 that couples the lamp ECU 2002 and the in-vehicle ECU 4 configured as an upstream stage, this leads to the occurrence of an out-of-control state in the variable light distribution device 2030. This means that an oncoming vehicle or a leading vehicle is disturbed or that a necessary area cannot be illuminated.

SUMMARY

1. A lighting circuit according to one embodiment of the present disclosure relates to a lighting circuit structured to turn on and off multiple semiconductor light sources. The lighting circuit includes: multiple current sources each of which is to be coupled in series with a corresponding one from among the multiple semiconductor light sources; a switching converter structured to supply a driving voltage across each of multiple series connection circuits each of which includes one of the multiple semiconductor light sources and one of the multiple current sources; and a converter controller structured to control the switching converter based on a relation between the voltage across one of the multiple current sources and a reference voltage having a positive correlation with temperature.

2. Another embodiment of the present disclosure relates to a driver circuit structured to supply a driving current to multiple semiconductor light sources. The driver circuit includes: multiple current sources each of which is to be coupled in series with a corresponding one from among the multiple semiconductor light sources; an interface circuit coupled to a processor, and structured to receive a control signal for indicating the on/off state of each of the multiple semiconductor light sources, to generate multiple individual control signals based on the control signal so as to set the on/off state of each of the multiple current sources; and a protection circuit structured to monitor communication between the processor and the interface circuit, and to forcibly set each of the multiple current sources to a predetermined state when an abnormal state has been detected.

Yet another embodiment of the present disclosure relates to an automotive lamp. The automotive lamp includes: a higher-level controller; an interface circuit structured to receive a control signal from the controller; a variable light distribution device; a local controller structured to control the variable light distribution device based on the control signal received by the interface circuit; and a protection circuit structured to monitor communication between the processor and the interface circuit, and to forcibly set a predetermined pattern for the variable light distribution device when an abnormal state has been detected.

It should be noted that any combination of the components described above, any component of the present disclosure, or any manifestation thereof, may be mutually substituted between a method, apparatus, system, and so forth, which are also effective as one embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of the Embodiments

Figure 1:
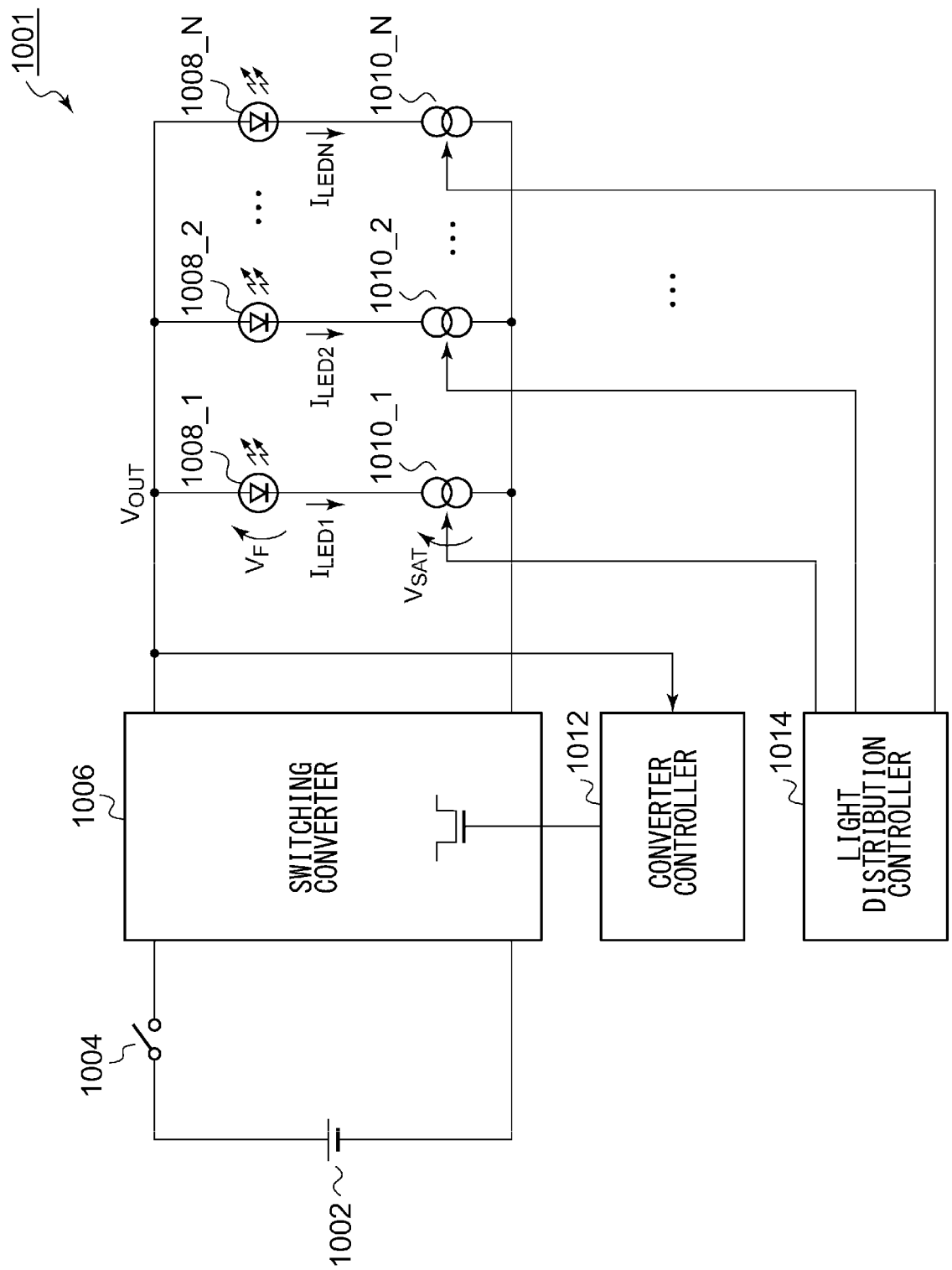
FIG. 1 is a block diagram showing a lamp system having an ADB function.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

1. One embodiment disclosed in the present specification relates to a lighting circuit structured to turn on and off multiple semiconductor light sources. The lighting circuit includes: multiple current sources each of which is to be coupled in series with a corresponding one from among the multiple semiconductor light sources; a switching converter structured to supply a driving voltage across each of multiple series connection circuits configured of the multiple semiconductor light sources and the multiple current sources; and a converter controller structured to control the switching converter based on a relation between the voltage across one from among the multiple current sources and a reference voltage having a positive correlation with temperature.

In a case in which the reference voltage is designed to be a minimum level that ensures that the current sources are each able to generate a predetermined amount of driving current in a sure manner, thereby allowing power loss in the current sources to be reduced. In a case in which the reference voltage is maintained at a constant value that is independent of the temperature, (i) when the reference voltage is set to a high voltage, such an arrangement is able to maintain the driving current at a predetermined amount even in a high-temperature state. However, such an arrangement has a problem of increased power loss when the temperature becomes low. Conversely, (ii) when the reference voltage is set to a low voltage, such an arrangement allows the power loss to be reduced in a low-temperature state. However, when the temperature becomes high, such an arrangement is not able to maintain the driving current at a predetermined amount, leading a reduction in the luminance of the semiconductor light sources. In contrast, in a case in which the reference voltage is changed based on a positive correlation with the temperature, this arrangement provides both an advantage of low power consumption in a low-temperature state and an advantage of maintaining the driving current in a high-temperature state.

Also, the converter controller may turn on a switching transistor of the switching converter in response to a reduction to the reference voltage in the voltage across one from among the multiple current sources.

Also, the current source may include a current mirror circuit. In this case, in a case in which the reference voltage is adjusted based on the temperature dependence of the pinch-off voltage (overdrive voltage) of the MOS transistors or the collector saturation voltage $V_{CE(sat)}$ of bipolar transistors that form the current mirror circuit, this arrangement allows the power consumption to be reduced.

Also, the converter controller may include: a constant voltage source structured to generate a constant voltage; and a correction current source structured to generate a correction current having a positive correlation with temperature. Also, the reference voltage may match the voltage obtained by adding the constant voltage to an offset voltage that is proportional to the correction current.

Also, the correction current may be generated using a temperature dependence of a forward voltage provided by a PN junction.

Also, the correction current source may include: at least one diode and a resistor coupled in series; and a current mirror circuit structured to copy a current that flows through the diode, so as to generate the correction current.

Also, the multiple semiconductor light sources may be integrated on a first semiconductor chip. Also, the multiple current sources may be integrated on a second semiconductor chip. Also, the first semiconductor chip and the second semiconductor chip may be arranged such that surfaces thereof are coupled to each other so as to form a module housed in a single package.

With an embodiment, the lighting circuit may be provided to an automotive lamp.

2. Another embodiment disclosed in the present specification relates to a driver circuit structured to supply a driving current to multiple semiconductor light sources. The driver circuit includes: multiple current sources each of which is to be coupled in series with a corresponding one from among the multiple semiconductor light sources; an interface circuit coupled to a processor, and structured to receive a control signal for indicating the on/off state of each of the multiple semiconductor light sources, to generate multiple individual control signals based on the control signal so as to set the on/off state of each of the multiple current sources; and a protection circuit structured to monitor communication between the processor and the interface circuit, and to forcibly set each of the multiple current sources to a predetermined state when an abnormal state has been detected.

With the embodiment, when the control signal cannot be transmitted normally, the multiple current sources are each set to a predetermined state, thereby allowing a predetermined light distribution pattern to be generated. This ensures a safety function that supports a situation in which an abnormal state has occurred in the lamp. More specifically, such an arrangement suppresses disturbance of leading vehicles or oncoming vehicles while securing a light distribution required for driving the user's vehicle. That is to say, this arrangement provides both high resolution and high safety.

Also, the predetermined state may correspond to a low-beam light distribution.

Also, the protection circuit may include: an abnormal state detection circuit structured to assert an abnormal state detection signal when an abnormal state has been detected; and a data replacement circuit structured such that, when the abnormal state detection signal is negated, the data replacement circuit outputs the multiple individual control signals as they are, and such that, when the abnormal state detection signal is asserted, the data replacement circuit outputs a set of predetermined values.

Also, the data replacement circuit may include: an inverter structured to invert the abnormal state detection signal so as to generate an inverted abnormal state detection signal; multiple first logic gates that correspond to multiple current sources to be turned on when an abnormal state has been detected, from among the multiple current sources; and multiple second logic gates that correspond to multiple current sources to be turned off when an abnormal state has been detected, from among the multiple current sources. Also, the first logic gates may each be structured to receive a corresponding individual control signal and one from among the abnormal state detection signal and the inverted abnormal state detection signal, and to supply an output thereof to the corresponding current source. Also, the second logic gates may each be structured to receive a corresponding individual control signal and the other one from among the abnormal state detection signal and the inverted abnormal state detection signal, and to supply an output thereof to the corresponding current source.

Also, when there is no occurrence of level transition in the control signal for a predetermined period, the protection circuit may judge that an abnormal state has occurred. This requires only a simple circuit configuration to detect the occurrence of an abnormal state in communication.

Yet another embodiment disclosed in the present specification relates to an automotive lamp. The automotive lamp includes: a higher-level controller; an interface circuit structured to receive a control signal from the higher-level controller; a variable light distribution device; a local controller structured to control the variable light distribution device based on the control signal received by the interface circuit; and an abnormal state detection unit structured to monitor communication between the higher-level controller and the interface circuit so as to detect an abnormal state. The automotive lamp is configured such that, when an abnormal state has been detected, a predetermined pattern is forcibly set for the variable light distribution device.

With the embodiment, when the control signal cannot be transmitted normally, a desired light distribution pattern can be generated according to a pattern set for the variable light distribution device. This suppresses disturbance of leading vehicles or oncoming vehicles while securing a light distribution required for driving the user's vehicle.

Also, the abnormal state detection unit may monitor an output of the local controller so as to detect an abnormal state. This arrangement provides a safety function for handling a situation in which an abnormal state has occurred in the local controller or a situation in which an abnormal state has occurred in communication between the local controller and the variable light distribution device.

EMBODIMENTS

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Embodiment 1

Figure 2:
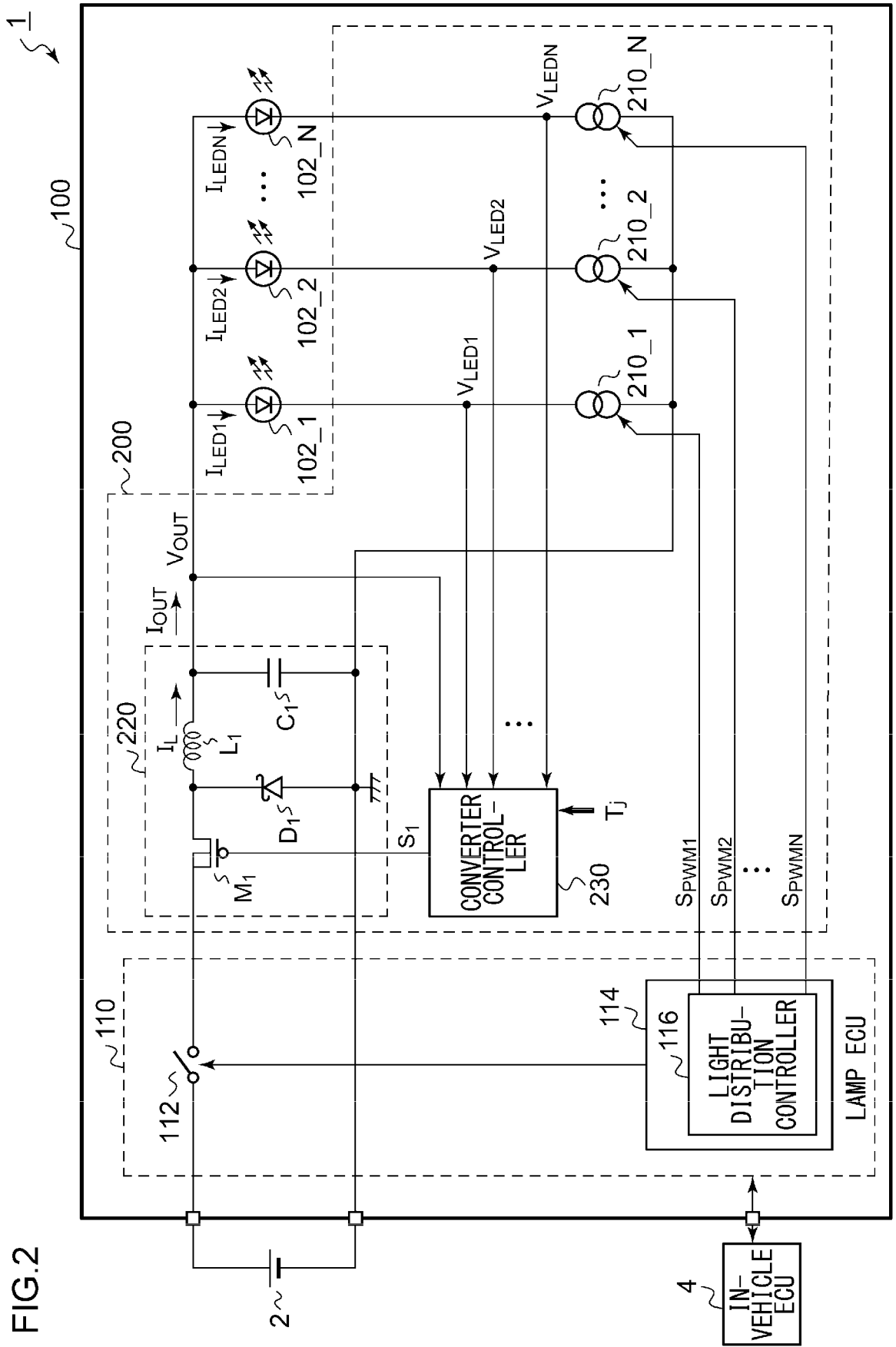
FIG. 2 is a block diagram showing a lamp system including an automotive lamp according to an embodiment 1.

FIG. 2 is a block diagram showing a lamp system 1 including an automotive lamp 100 according to an embodiment 1. The lamp system 1 includes a battery 2, an in-vehicle Electronic Control Unit (ECU) 4, and an automotive lamp 100. The automotive lamp 100 is configured as a variable light distribution headlamp having an ADB function. The automotive lamp 100 generates a light distribution according to a control signal received from the in-vehicle ECU 4.

The automotive lamp 100 includes multiple (N≥2) semiconductor light sources 102_1 through 102_N, a lamp ECU 110, and a lighting circuit 200. Each semiconductor light source 102 may preferably be configured using an LED. Also, various kinds of light-emitting elements such as an LD, organic EL, or the like, may be employed. Each semiconductor light source 102 may include multiple light-emitting elements coupled in series and/or coupled in parallel. It should be noted that the number of channels, i.e., N, is not restricted in particular. Also, N may be 1.

The lamp ECU 110 includes a switch 112 and a microcontroller 114. The microcontroller (processor) 114 is coupled to the in-vehicle ECU 4 via a bus such as a Controller Area Network (CAN) or Local Interconnect Network (LIN) or the like. This allows the microcontroller 114 to receive various kinds of information such as a turn-on/turn-off instruction, etc. The microcontroller 114 turns on the switch 112 according to a turn-on instruction received from the in-vehicle ECU 4. In this state, a power supply voltage (battery voltage $V_{BAT}$) is supplied from the battery 2 to the lighting circuit 200.

Furthermore, the microcontroller 114 receives a control signal for indicating the light distribution pattern from the in-vehicle ECU 4, and controls the lighting circuit 200. Also, the microcontroller 114 may receive information that indicates the situation ahead of the vehicle from the in-vehicle ECU 4, and may autonomously generate the light distribution pattern based on the information thus received.

The lighting circuit 200 supplies the driving currents $I_{LED1}$ through $I_{LEDN}$ to the multiple semiconductor light sources 102_1 through 102_N so as to provide a desired light distribution pattern.

The lighting circuit 200 includes multiple current sources 210_1 through 210_N, a switching converter 220, and a converter controller 230. Each current source 210_i (i=1, 2, . . . , N) is coupled to the corresponding semiconductor light source 102_i in series. The current source 210_i functions as a constant current driver that stabilizes the driving current $I_{LEDi}$ that flows through the semiconductor light source 102_i to a predetermined current amount.

The multiple current sources 210_1 through 210_N are each configured to be capable of controlling their on/off states independently according to PWM signals $S_{PWM1}$ through $S_{PWMN}$ generated by the light distribution controller 116. When the PWM signal $S_{PWMi}$ is set to the on level (e.g., high level), the driving current $I_{LEDi}$ flows, thereby turning on the semiconductor light source 102_i. Conversely, when the PWM signal $S_{PWMi}$ is set to the off level (e.g., low level), the driving current $I_{LEDi}$ is set to zero, thereby turning off the semiconductor light source 102_i. By changing the duty ratio of the PWM signal $S_{PWMi}$, such an arrangement allows the effective luminance of the semiconductor light source 102_i to be changed (PWM dimming).

The switching converter 220 supplies a driving voltage $V_{OUT}$ across a series connection circuit of the semiconductor light source 102 and the current source 210. The switching converter 220 is configured as a step-down converter (Buck converter) including a switching transistor $M_1$, a rectification diode $D_1$, an inductor $L_1$, and an output capacitor $C_1$.

In order to allow the current source 210 to maintain the driving current $I_{LED}$ at a predetermined amount, the voltage $V_{CS}$ across the current source 210 is required to be higher than a predetermined threshold value (which will be referred to as a "saturation voltage $V_{SAT}$"). The converter controller 230 monitors the temperature $T_j$, and controls the switching converter 220 based on a relation between the voltage $V_{CS}$ across any one from among the multiple current sources 210 and a reference voltage (which will be referred to as a "bottom limit voltage $V_{BOTTOM}$" hereafter) having a positive correlation with the temperature $T_j$. The bottom limit voltage $V_{BOTTOM}$ is set such that it is substantially the same as the saturation voltage $V_{SAT}$ or such that it is slightly higher than the saturation voltage $V_{SAT}$.

The converter controller 230 employs a ripple control method. The converter controller 230 turns on the switching transistor $M_1$ of the switching converter 220 when the voltage $V_{CS}$ across any one of the multiple current sources 210 decreases to the bottom limit voltage $V_{BOTTOM}$. In the example shown in FIG. 2, one end of each current source 210 is grounded. Accordingly, the voltage $V_{LED}$ at a connection node that couples each current source 210 and the corresponding semiconductor light source 102 is set to the voltage $V_{CS}$ across the current source 210.

Furthermore, when a predetermined turn-off condition is satisfied, the converter controller 230 switches a control pulse $S_1$ to the off level (high level), thereby turning off the switching transistor $M_1$. The turn-off condition may be that the output voltage $V_{OUT}$ of the switching converter 220 has reached a predetermined upper limit voltage $V_{UPPER}$.

The above is the configuration of the automotive lamp 100. Next, description will be made regarding the operation thereof.

Figure 3:
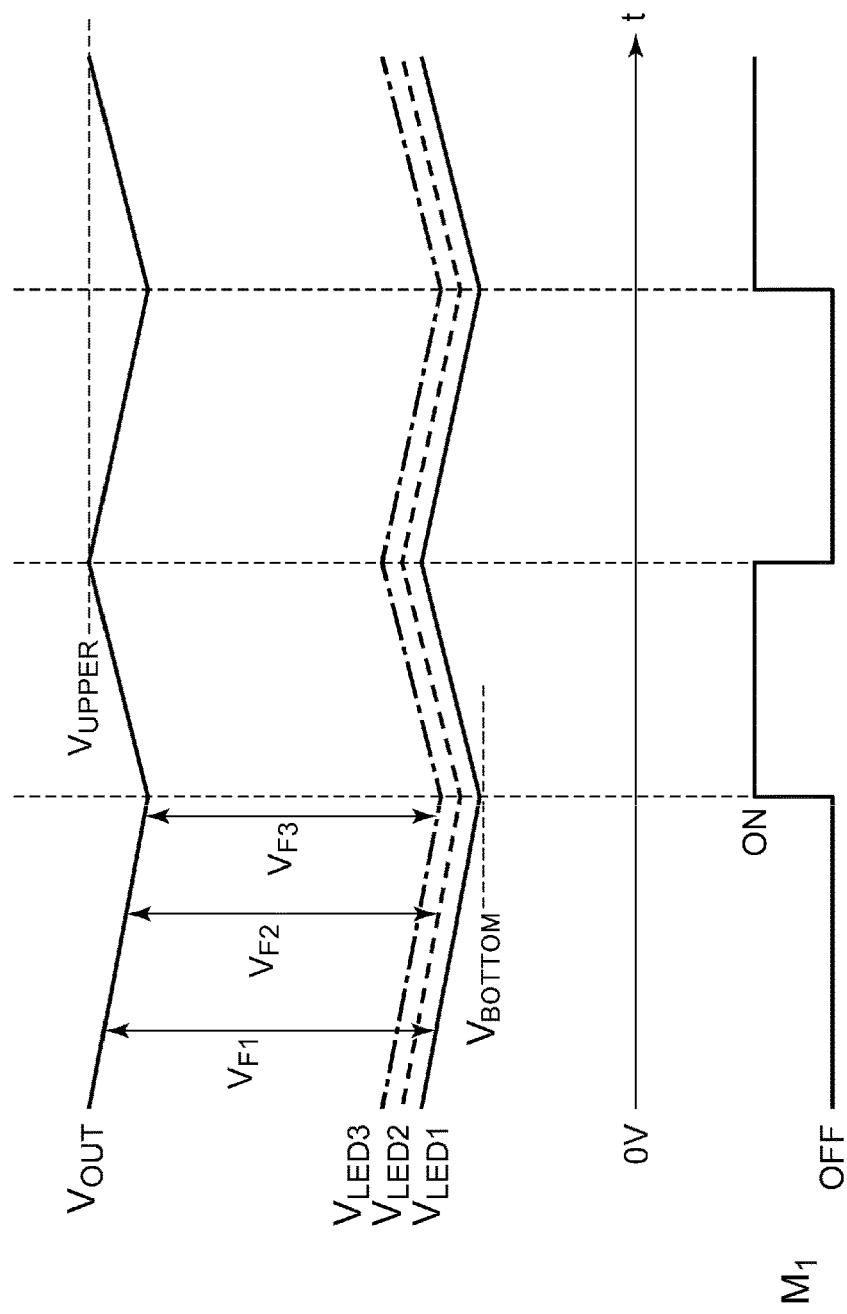
FIG. 3 is an operation waveform diagram showing the operation of the automotive lamp shown in FIG. 2.

FIG. 3 is an operation waveform diagram showing the operation of the automotive lamp 100 shown in FIG. 2. For ease of understanding, description will be made regarding an example in which N=3. Furthermore, description will be made assuming that there is only negligible element variation between the multiple current sources 210_1 through 210_N. Furthermore, description will be made assuming that the relation $V_{F1}>V_{F2}>V_{F3}$ holds true due to element variation between the semiconductor light sources 102. For ease of understanding, description will be made regarding the operation without involving PWM dimming.

In the off period (low-level period in the drawing) of the switching transistor $M_1$, the output capacitor $C_1$ of the switching converter 220 is discharged due to a load current $I_{OUT}$ which is the sum total of the driving currents $I_{LED1}$ through $I_{LED3}$, which lowers the output voltage $V_{OUT}$ with time. In actuality, the output capacitor $C_1$ is charged or discharged by the difference between the coil current $I_L$ that flows through the inductor $L_1$ and the load current. Accordingly, the increase/decrease of the output voltage $V_{OUT}$ does not necessarily match the on/off state of the switching transistor $M_1$ on the time axis.

The voltages that each occur across each current source 210, i.e., the voltages (cathode voltages) $V_{LED1}$ through $V_{LED3}$ at the connection nodes that each connect the corresponding current source 210 and the corresponding semiconductor light source 102, are represented by the following Expressions.

$V_{LED1}=V_{OUT}-V_{F1}$ $V_{LED2}=V_{OUT}-V_{F2}$ $V_{LED3}=V_{OUT}-V_{F3}$

Accordingly, the voltages $V_{LED1}$ through $V_{LED3}$ each change while maintaining a constant voltage difference with respect to the output voltage $V_{OUT}$. In this example, the forward voltage $V_{F1}$ at the first channel is the largest value. Accordingly, the cathode voltage $V_{LED1}$ at the first channel is the smallest value.

When the cathode voltage $V_{LED1}$ at the first channel decreases to the bottom limit voltage $V_{BOTTOM}$, the switching transistor $M_1$ is turned on.

When the switching transistor $M_1$ is turned on, this raises the coil current $I_L$ that flows through the inductor $L_1$, which switches the output voltage $V_{OUT}$ to an increasing phase. Subsequently, when the output voltage $V_{OUT}$ reaches the upper limit voltage $V_{UPPER}$, the switching transistor $M_1$ is turned off. The lighting circuit 200 repeats this operation.

The above is the operation of the lighting circuit 200. The lighting circuit 200 is capable of maintaining the voltage across each current source 210 at a level in the vicinity of the minimum level that ensures that each lighting circuit 200 is able to generate a predetermined driving current $I_{LED}$. This arrangement provides reduced power consumption.

As another approach (comparison technique), an arrangement is conceivable in which the cathode voltages $V_{LED1}$ through $V_{LEDN}$ are feedback controlled using an error amplifier such that the minimum voltage thereof approaches a predetermined target value $V_{REF}$.

Figure 4B:
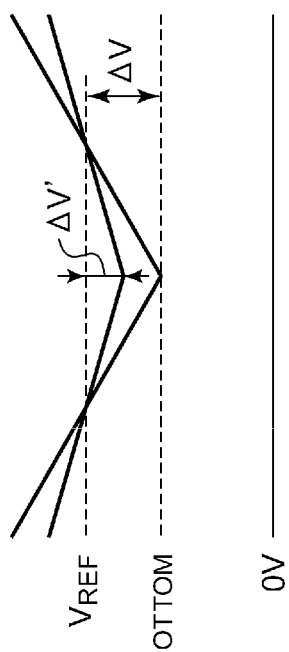
FIG. 4B is a waveform diagram showing the cathode voltage $V_{LED}$ in a comparison technique.
Figure 4A:
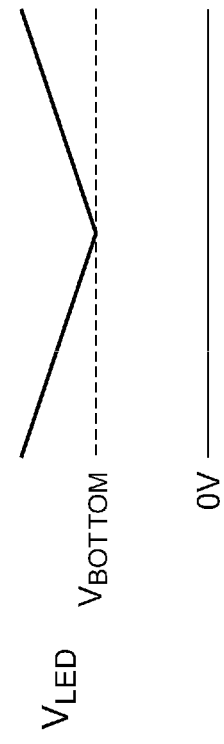
FIG. 4A is a waveform diagram showing the cathode voltage $V_{LED}$ in the embodiment 1.

FIG. 4A is a waveform diagram showing the cathode voltage $V_{LED}$ provided by the embodiment 1. FIG. 4B is a waveform diagram showing the cathode voltage $V_{LED}$ provided by a comparison technique. The cathode voltages $V_{LED}$ shown in these drawings are each the lowest voltage $V_{MIN}$ from among the multiple cathode voltages.

With the comparison technique, the average of the minimum voltage $V_{MIN}$ from among the cathode voltages $V_{LED1}$ through $V_{LEDN}$ approaches the target voltage $V_{REF}$ due to the response characteristics of a phase compensation filter provided to a feedback loop. That is to say, the bottom level $V_{MIN\_BOTTOM}$ of the minimum voltage $V_{MIN}$ is lower than the target voltage $V_{REF}$. In this case, the difference between the bottom level $V_{MIN\_BOTTOM}$ and the target voltage $V_{REF}$ changes in an unstable manner depending on the situation. In order to provide stable circuit operation, as indicated by the solid line in FIG. 4B, there is a need to set $V_{REF}$ to a high value assuming that there is a large difference $\Delta V$ between the bottom level $V_{MIN\_BOTTOM}$ and the target voltage $V_{REF}$. However, in a situation in which there is a small difference $\Delta V'$ between them as indicated by the line of alternately long and short dashes, the cathode voltage $V_{LED}$ is higher than the bottom limit voltage $V_{BOTTOM}$, leading to the occurrence of unnecessary power consumption in the current source. With the embodiment 1, as shown in FIG. 4A, this arrangement allows the bottom level of the cathode voltage $V_{LED}$ to approach the bottom limit voltage $V_{BOTTOM}$, thereby providing further reduced power consumption as compared with the comparison technique.

Figure 5:
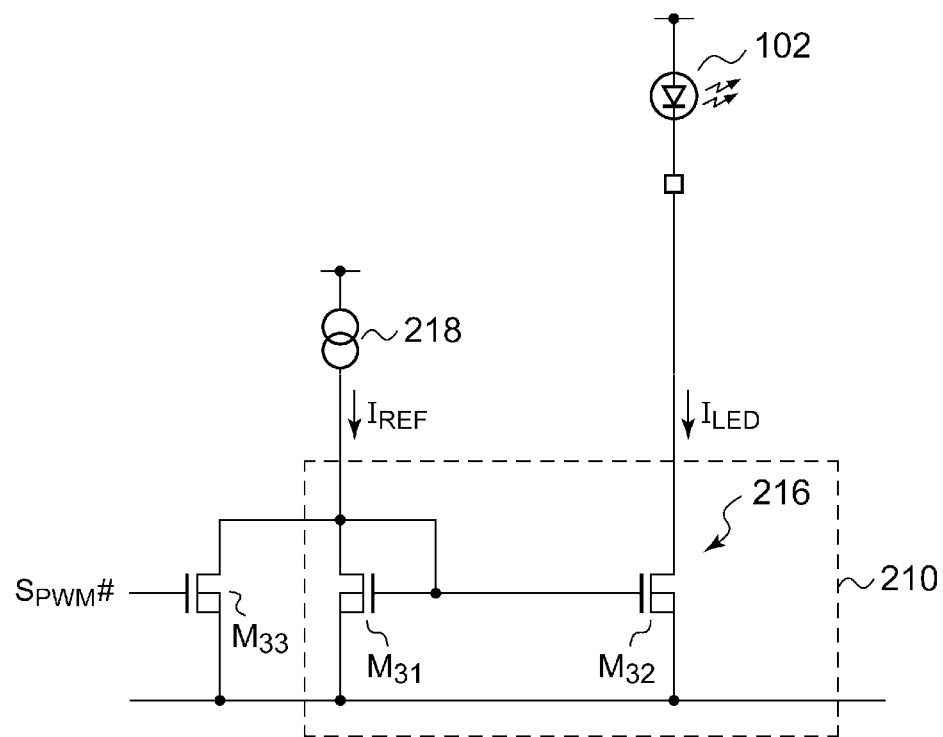
FIG. 5 is a circuit diagram showing an example configuration of multiple current sources.

Each current source 210 includes a transistor provided in series with the corresponding semiconductor light source 102. By adjusting the voltage and current applied to a control terminal (gate or base) of the transistor, this arrangement allows the driving current $I_{LED}$ to be maintained at a constant level. FIG. 5 shows an example configuration of the multiple current sources 210_1 through 210_N. Each current source 210_# ("#"=1, 2, . . . , N) is configured as a current mirror circuit 216 including transistors $M_{31}$ and $M_{32}$. The input-side transistor $M_{31}$ is coupled to a reference current source 218. A driving current $I_{LED}$ flows through the output-side transistor $M_{32}$ with an amount of current obtained by multiplying the reference current $I_{REF}$ by a mirror ratio (K). A transistor $M_{33}$ is provided in order to control the on/off state of the current source 210. The transistor $M_{33}$ is arranged between the ground and a connection node that couples the gate and the drain of the transistor $M_{31}$. When the $S_{PWM}\#$ signal is set to the high level, the transistor $M_{33}$ is turned on, which turns off the current source 210. In this state, the current source 210 is turned off, and accordingly, the driving current $I_{LED}$ becomes zero. Conversely, when the $S_{PWM}\#$ signal is set to the low level, the transistor $M_{33}$ is turned off, which turns on the current source 210. In this state, the current source 210 is turned on, and accordingly, the driving current $I_{LED}$ flows.

Figure 6A:
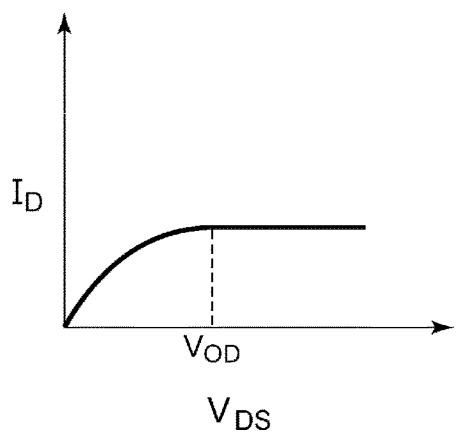
FIG. 6A is a diagram showing the I-V characteristics of a MOS transistor.
Figure 6B:
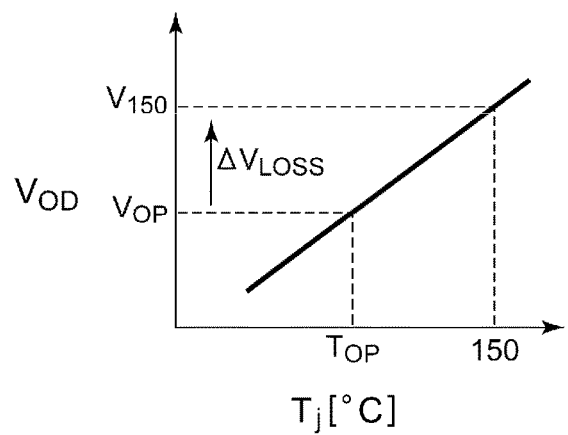
FIG. 6B is a diagram showing a relation between the temperature and the overdrive voltage.

FIG. 6A is a diagram showing the I-V characteristics of a MOS transistor. FIG. 6B is a diagram showing a relation between the temperature and the overdrive voltage. When the drain-source voltage $V_{DS}$ is in a range that is higher than the overdrive voltage $V_{OD}$ (or pinch-off voltage, or simply referred to as the "saturation voltage $V_{DS(sat)}$") the drain current $I_D$ that flows through the MOS transistor becomes constant. The overdrive voltage $V_{OD}$ is represented by the difference between the gate-source voltage $V_{GS}$ and the threshold voltage $V_{GS(th)}$.

$$V_{OD} = V_{GS} - V_{GS(th)}$$

The threshold voltage $V_{GS(th)}$ has a negative correlation with the temperature. Accordingly, the overdrive voltage $V_{OD}$ has a positive correlation with the temperature as shown in FIG. 6B. In a case in which a bipolar transistor is employed instead of such a MOS transistor, the overdrive voltage $V_{OD}$ corresponds to a collector-emitter saturation voltage $V_{CE(sat)}$.

The current source 210 configured as the current mirror circuit shown in FIG. 5 is required to be designed to have an operation point in a range where the voltage $V_{CS}$ across the current source 210 is higher than the overdrive voltage $V_{OD}$. In other words, the saturation voltage $V_{SAT}$ of the current source 210 shown in FIG. 5 matches the overdrive voltage $V_{OD}$.

In the present embodiment 1, the bottom limit voltage $V_{BOTTOM}$ is changed such that it has a positive correlation with the temperature $T_j$. This arrangement allows the bottom limit voltage $V_{BOTTOM}$ to follow the change in the saturation voltage $V_{SAT}$ (i.e., the overdrive voltage $V_{OD}$) due to temperature variation.

As a comparison technique, description will be made regarding an arrangement in which the bottom limit voltage $V_{BOTTOM}$ is set to a constant value that is independent of the temperature. Description will be made assuming that the semiconductor light source 102 has a maximum rated junction temperature $T_j$ of 150° C., for example. In a case in which the semiconductor light source 102 and the current source 210 are arranged in the vicinity of each other or in a case in which they are mounted on a common heat sink, such an arrangement requires the semiconductor light source 102 to have the same maximum rated junction temperature $T_j$ of 150° C. In this case, in a case in which the bottom limit voltage $V_{BOTTOM}$ is set to the overdrive voltage $V_{150}$ at the temperature $T_j$ of 150° C., this allows a predetermined amount of driving current to be maintained even in a case of a high temperature of up to 150° C. However, in actual operations, the junction temperature of the current source 210 is lower than 150° C. Accordingly, with the difference between the overdrive voltage $V_{OP}$ at the junction temperature in the actual operation and the overdrive voltage $V_{150}$ at the temperature of 150° C. as $\Delta V_{LOSS}$, this leads to the occurrence of excess power loss of ($I_{LED} \times \Delta V_{LOSS}$). This leads to large heat generation. In a case in which there is no countermeasure for such a problem, this lowers the allowable operating ambient temperature, resulting in degraded marketability of the automotive lamp 100. In a case in which an additional heat dissipation or cooling member such as a large-size heat sink or a fan is provided in order to solve such a problem, this leads to a problem of increased costs.

Conversely, in a case in which the bottom limit voltage $V_{BOTTOM}$ is designed with the junction temperature $T_{OP}$ in the normal operation as a reference, such an arrangement allows the power loss to be reduced when $T_j = T_{OP}$. However, when the temperature becomes high ($T_j$ becomes approximately 150° C.), such an arrangement cannot maintain a predetermined amount of driving current $I_{LED}$, leading to a reduction in the luminance of the semiconductor light source 102.

As compared with the comparison technique, with the present embodiment 1, the bottom limit voltage $V_{BOTTOM}$ can be set to an optimum value for each temperature. This allows the power loss to be reduced in a low-temperature state. In addition, this arrangement is capable of suppressing a reduction of the luminance in a high-temperature state.

The present disclosure encompasses various kinds of apparatuses, circuits, and methods that can be regarded as a block configuration or a circuit configuration shown in FIG. 2, or otherwise that can be derived from the aforementioned description. That is to say, the present disclosure is not restricted to a specific configuration. More specific description will be made below regarding an example configuration or a modification for clarification and ease of understanding of the essence of the present disclosure and the circuit operation. That is to say, the following description will by no means be intended to restrict the technical scope of the present disclosure.

Example 1-1

Figure 7:
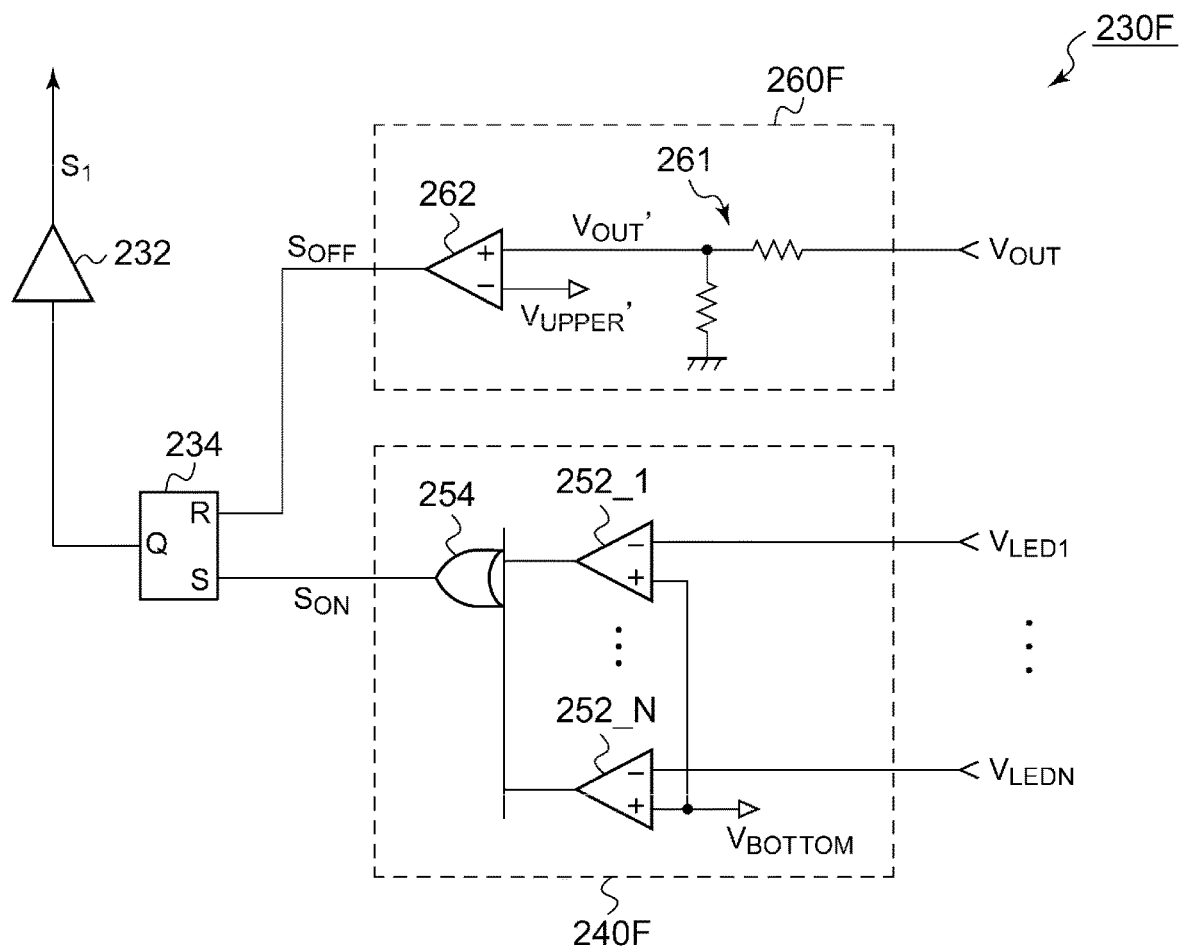
FIG. 7 is a circuit diagram showing a converter controller according to an example 1-1.

FIG. 7 is a circuit diagram showing a converter controller 230F according to an example 1-1. An on signal generating circuit 240F includes multiple comparators 252_1 through 252_N, and a logic gate 254. Each comparator 252_i compares the corresponding cathode voltage $V_{LEDi}$ with the bottom limit voltage $V_{BOTTOM}$. The comparator 252_i generates a comparison signal that is asserted (e.g., set to the high level) when $V_{LEDi} < V_{BOTTOM}$. The logic gate 254 performs a logical operation on the outputs (comparison signals) $S_{CMP1}$ through $S_{CMPN}$ of the multiple comparators 252_1 through 252_N. When at least one comparison signal is asserted, the logic gate 254 asserts the on signal $S_{ON}$. In this example, the logic gate 254 is configured as an OR gate.

An off signal generating circuit 260F generates an off signal $S_{OFF}$ which determines the timing at which the switching transistor $M_1$ is to be turned off. A voltage dividing circuit 261 divides the output voltage $V_{OUT}$ such that it is scaled to an appropriate voltage level. A comparator 262 compares the output voltage $V_{OUT}'$ thus divided with a threshold value $V_{UPPER}'$ obtained by scaling the upper limit voltage $V_{UPPER}$. When the relation $V_{OUT}' > V_{UPPER}'$ is detected, the comparator 262 asserts the off signal $S_{OFF}$ (e.g., set to the high level).

The logic circuit 234 is configured as an SR flip-flop, for example. The logic circuit 234 switches its output Q to the on level (e.g., high level) in response to the assertion of the on signal $S_{ON}$. Furthermore, the logic circuit 234 switches its output Q to the off level (e.g., low level) in response to the assertion of the off signal $S_{OFF}$. It should be noted that the logic circuit 234 is preferably configured as a reset-priority flip-flop in order to set the switching converter to a safer state (i.e., off state of the switching transistor $M_1$) when the assertion of the on signal $S_{ON}$ and the assertion of the off signal $S_{OFF}$ occur at the same time.

A driver 232 drives the switching transistor $M_1$ according to the output Q of the logic circuit 234. As shown in FIG. 2, in a case in which the switching transistor $M_1$ is configured as a P-channel MOSFET, when the output Q is set to the on level, the control pulse $S_1$, which is configured as the output of the driver 232, is set to a low voltage ($V_{BAT} - V_G$). When the output Q is set to the off level, the control pulse $S_1$ is set to the high voltage ($V_{BAT}$).

Figure 8:
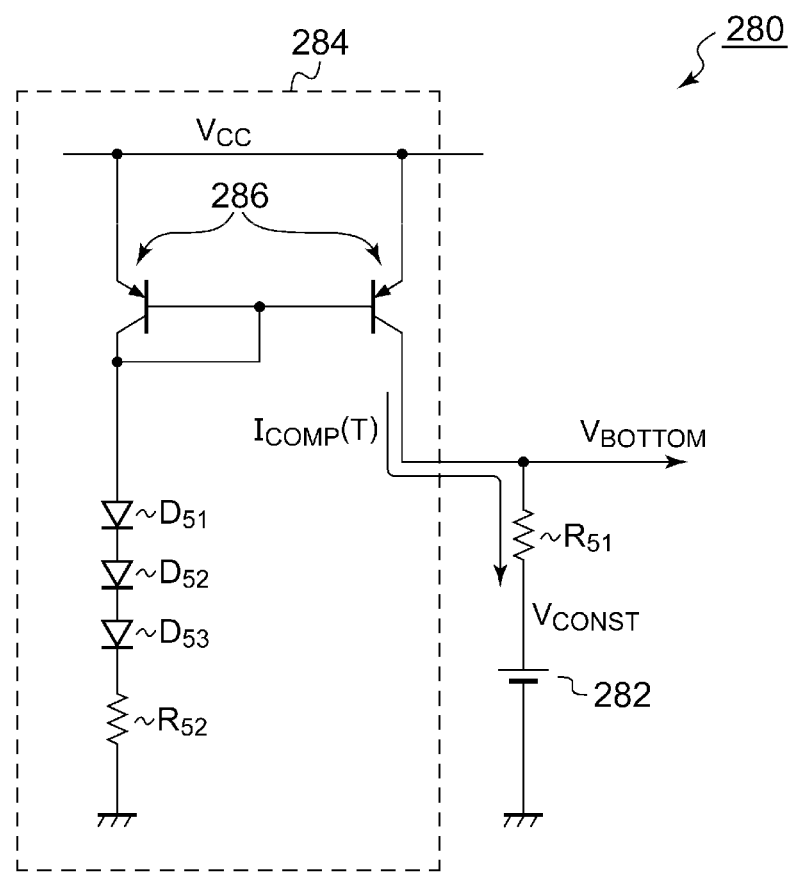
FIG. 8 is a circuit diagram showing an example of a voltage generating circuit that generates the bottom limit voltage $V_{BOTTOM}$.

FIG. 8 is a circuit diagram showing an example of a voltage generating circuit 280 that generates the bottom limit voltage $V_{BOTTOM}$. The voltage generating circuit 280 includes a constant voltage source 282, a correction current source 284, and a resistor $R_{51}$. The constant voltage source 282 generates a constant voltage $V_{CONST}$. The correction current source 284 generates a correction current $I_{COMP}$ having a positive correlation with the junction temperature $T_j$. The bottom limit voltage $V_{BOTTOM}$ is generated as a voltage obtained by adding the constant voltage $V_{CONST}$ to an offset voltage $V_{OFS}$ that is proportional to the correction current $I_{COMP}$. For example, one end of a resistor $R_{51}$ may be coupled to an output of the constant voltage source 282. Furthermore, a correction current $I_{COMP}$ is applied to the one end of the resistor $R_{51}$ so as to generate a voltage drop ($I_{COMP} \times R_{51}$) across the resistor $R_{51}$. The bottom limit voltage $V_{BOTTOM}$ may be output as a voltage that occurs at the other end of the resistor $R_{51}$.

$$V_{BOTTOM} = V_{CONST} + I_{COMP} \times R_{51}$$

Description has been made in this example regarding an arrangement in which the source-type correction current source 284 is coupled to a high electrical potential side of the resistor $R_{51}$. Also, the correction current source 284 configured as a sink-type current source may be coupled to a low electric potential side of the resistor $R_{51}$.

The configuration of the correction current source 284 is not restricted in particular. For example, the correction current $I_{COMP}$ may be generated using the temperature dependence of the forward voltage Vf of a PN junction. In FIG. 8, the correction current source 284 includes multiple diodes $D_{51}$ through $D_{53}$ and a resistor $R_{52}$ coupled in series, and a current mirror circuit 286 that copies a current It that flows through the multiple diodes $D_{51}$ through $D_{53}$. With the forward voltage of each diode as Df, the current It is represented by It=$(V_{CC} - V_{BE} - 3 \times Vf)/R_{51}$.

In a case in which Vf is approximately equal to $V_{BE}$, the current It is represented by It=$(V_{CC} - 4 \times V_{BE})/R_{51}$. Here, $V_{BE}$ has a negative correlation with the temperature. Accordingly, the current It has a positive correlation with the temperature.

Figure 9:
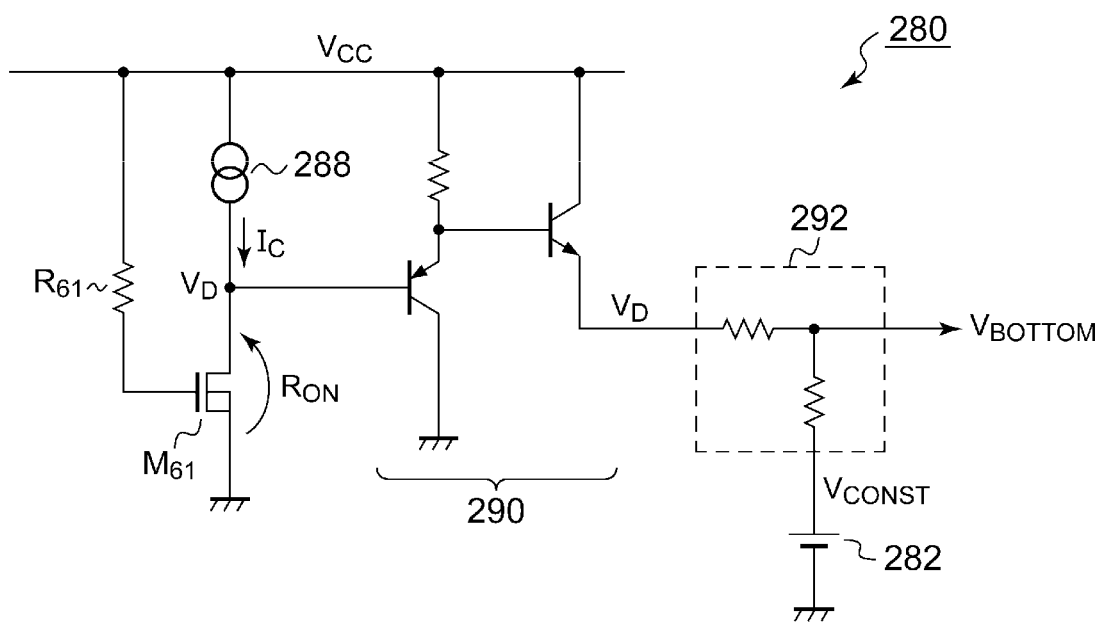
FIG. 9 is another example of the voltage generating circuit that generates the bottom limit voltage $V_{BOTTOM}$.

FIG. 9 is a circuit diagram showing another example of the voltage generating circuit 280 that generates the bottom limit voltage $V_{BOTTOM}$. The voltage generating circuit 280 includes a current source 288, a MOS transistor $M_{61}$, an emitter follower circuit 290, and a resistor network 292. The MOS transistor $M_{61}$ is provided on a path of the current $I_C$ generated by the current source 288. The gate of the MOS transistor $M_{61}$ is biased such that the MOS transistor $M_{61}$ operates in a linear region. For example, the power supply voltage $V_{CC}$ is applied to the gate via the resistor $R_{61}$. With such an arrangement, the drain voltage $V_D$ is proportional to the on resistance $R_{ON}$.

$$V_D = R_{ON} \times I_C$$

The on resistance $R_{ON}$ of a MOS transistor has a positive correlation with the temperature. Accordingly, the drain voltage $V_D$ also has a positive correlation with the temperature. The drain voltage $V_D$ is input to an emitter follower circuit 290. The emitter follower circuit 290 has a two-stage configuration including a PNP stage and an NPN stage. Such a configuration cancels out the base-emitter voltages $V_{BE}$. Accordingly, the output voltage of the emitter follower circuit 290 is equal to the drain voltage $V_D$ of the transistor $M_{61}$.

The resistor network 292 generates a weighted sum (average) of the constant voltage $V_{CONST}$ and the drain voltage $V_D$ having a positive temperature coefficient so as to generate the bottom limit voltage $V_{BOTTOM}$. As a result, the bottom limit voltage $V_{BOTTOM}$ has a positive temperature coefficient.

Example 1-2

Figure 10:
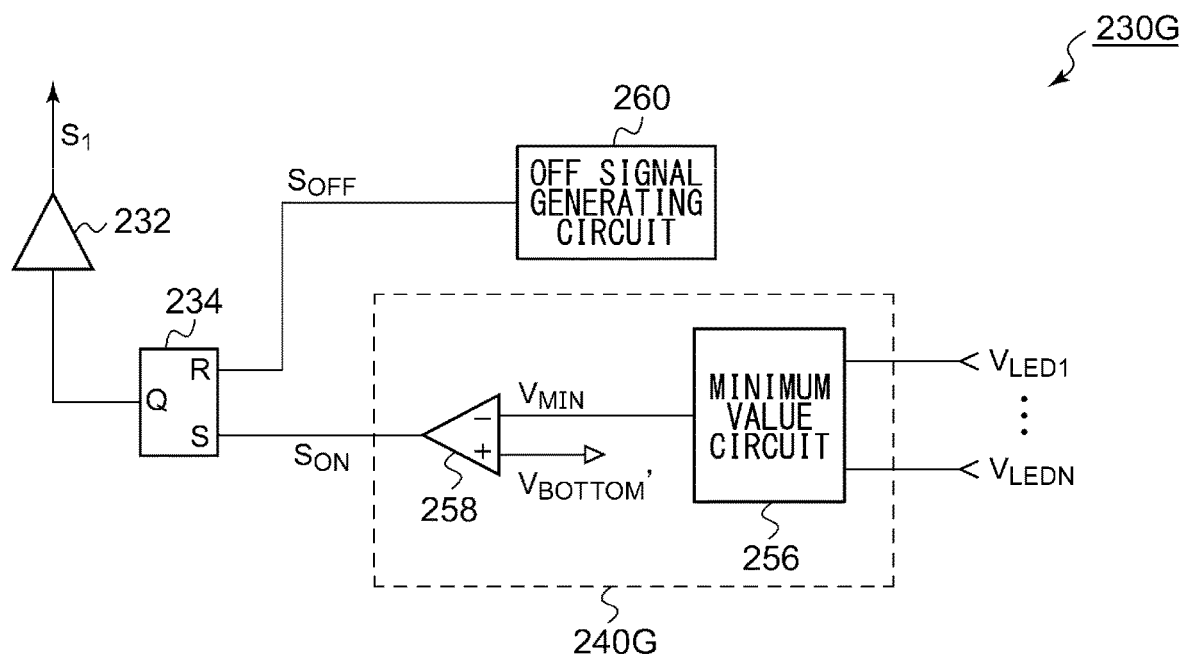
FIG. 10 is a circuit diagram showing a converter controller according to an example 1-2.

FIG. 10 is a circuit diagram showing a comparator controller 230G according to an example 1-2. An on signal generating circuit 240G includes a minimum value circuit 256 and a comparator 258. The minimum value circuit 256 outputs a voltage $V_{MIN}$ that corresponds to the minimum value from among the multiple cathode voltages $V_{LED1}$ through $V_{LEDN}$. The minimum value circuit 256 may preferably be configured using known techniques. The comparator 258 compares the voltage $V_{MIN}$ with a threshold value $V_{BOTTOM}'$ that corresponds to the bottom limit voltage $V_{BOTTOM}$. When the relation $V_{MIN} < V_{BOTTOM}'$ holds true, the comparator 258 asserts the on signal $S_{ON}$ (e.g., set to the high level). The bottom limit voltage $V_{BOTTOM}'$ has a positive correlation with the temperature. In a case in which the relation between $V_{MIN}$ and the minimum voltage from among $V_{LED1}$ through $V_{LEDN}$, i.e., Va, is represented by a function $V_{MIN}=f(Va)$, the relation $V_{BOTTOM}'=f(V_{BOTTOM})$ holds true.

With the example 1-1, in a case in which there are a large number of channels, the circuit area required by the comparator group is large and the chip size becomes large. In contrast, with the example 1-2, such an arrangement requires only a single comparator, thereby allowing the circuit area to be reduced.

Example 1-3

Figure 11:
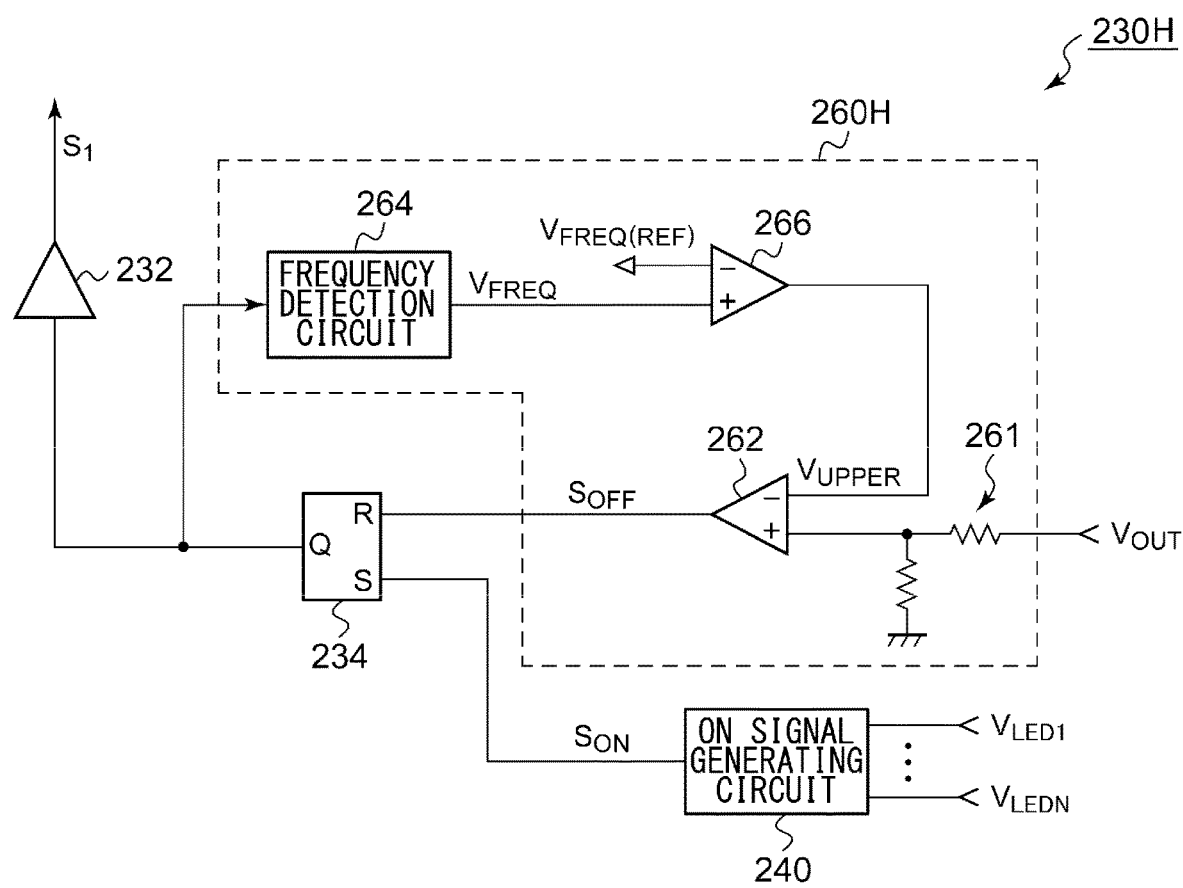
FIG. 11 is a circuit diagram showing a converter controller according to an example 1-3.

FIG. 11 is a circuit diagram showing a converter controller 230H according to an example 1-3. With this example, the upper limit voltage $V_{UPPER}$ is feedback controlled so as to maintain the switching frequency of the switching transistor $M_1$ at a constant value.

An off signal generating circuit 260H includes a frequency detection circuit 264 and an error amplifier 266 in addition to the comparator 262. The frequency detection circuit 264 monitors the output Q of the logic circuit 234 or the control pulse $S_1$, and generates a frequency detection signal $V_{FREQ}$ that indicates the switching frequency. The error amplifier 266 amplifies the difference between the frequency detection signal $V_{FREQ}$ and the reference voltage $V_{FREQ(REF)}$ that defines a target value of the switching frequency, and generates the upper limit voltage $V_{UPPER}$ that corresponds to the difference thus amplified.

With the example 1-3, this arrangement is capable of stabilizing the switching frequency to a target value. This allows the noise countermeasures to be provided in a simple manner.

Example 1-4

Figure 12:
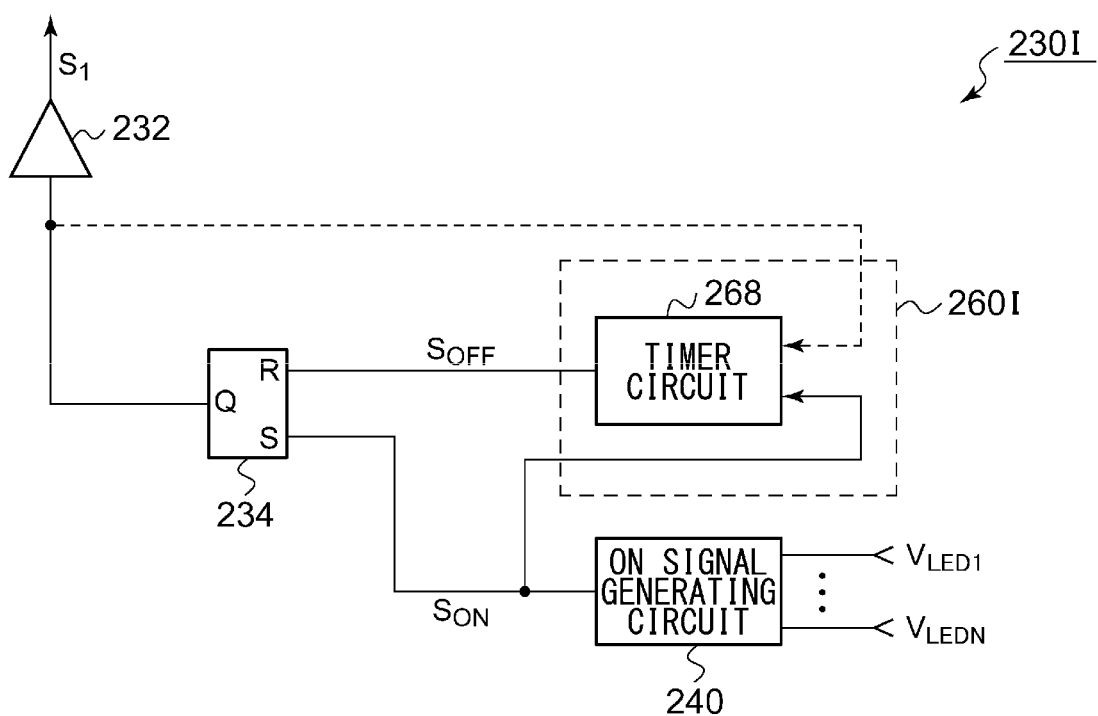
FIG. 12 is a circuit diagram showing a converter controller according to an example 1-4.

FIG. 12 is a circuit diagram showing a converter controller 230I according to an example 1-4. The converter controller 230I may turn off the switching transistor $M_1$ after the on time $T_{ON}$ elapses after the switching transistor $M_1$ is turned on. That is to say, as the turn-off condition, a condition that the on time $T_{ON}$ elapses after the switching transistor $M_1$ is turned off may be employed.

An off signal generating circuit 260I includes a timer circuit 268. The timer circuit 268 starts the measurement of the predetermined on time $T_{ON}$ in response to the on signal $S_{ON}$. After the on time $T_{ON}$ elapses, the timer circuit 268 asserts (e.g., sets to the high level) the off signal $S_{OFF}$. The timer circuit 268 may be configured as a monostable multivibrator (one-shot pulse generator), for example. Also, the timer circuit 268 may be configured as a digital counter or an analog timer. In order to detect the timing at which the switching transistor $M_1$ is turned on, the timer circuit 268 may receive the output Q of the logic circuit 234 or the control pulse $S_1$ as its input signal instead of the on signal $S_{ON}$.

Example 1-5

Figure 13:
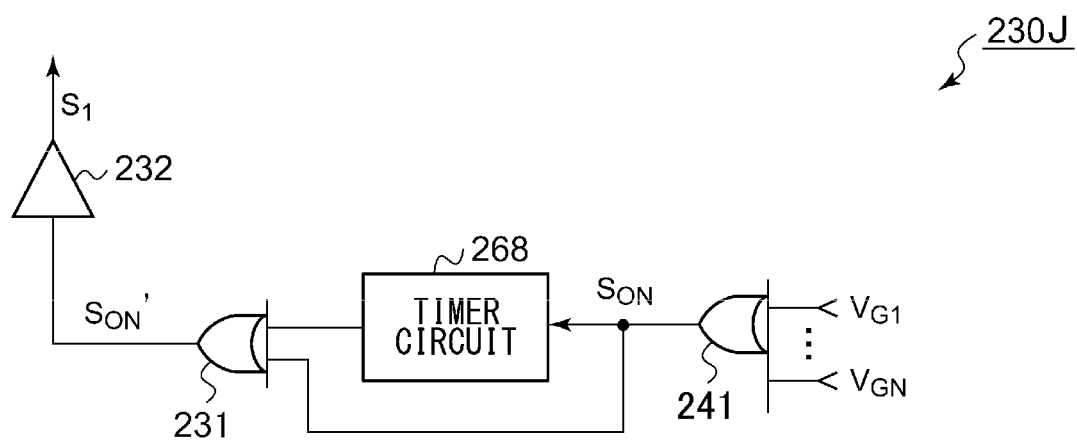
FIG. 13 is a circuit diagram showing a converter controller according to an example 1-5.

FIG. 13 is a circuit diagram showing a converter controller 230J according to an example 1-5. As with the example 1-4, the converter controller 230J turns off the switching transistor $M_1$ after the on time $T_{ON}$ elapses after the switching transistor $M_1$ is turned on. An OR gate 241 corresponds to the on signal generating circuit, and generates the on signal $S_{ON}$. The timer circuit 268 is configured as a monostable multivibrator or the like. The timer circuit 268 generates the pulse signal $S_P$ that is set to the high level for a predetermined on time $T_{ON}$ after the assertion of the on signal $S_{ON}$, and supplies the pulse signal $S_P$ to the driver 232. It should be noted that, giving consideration to a situation in which the voltages $V_{G1}$ through $V_{GN}$ are each lower than the threshold value of the OR gate 241 in the startup operation or the like, an OR gate 231 is provided as an additional component. With such an arrangement, the logical OR $S_P'$ of the on signal $S_{ON}$ and the output $S_P$ of the timer circuit 268 is supplied to the driver 232.

Example 1-6

Figure 14:
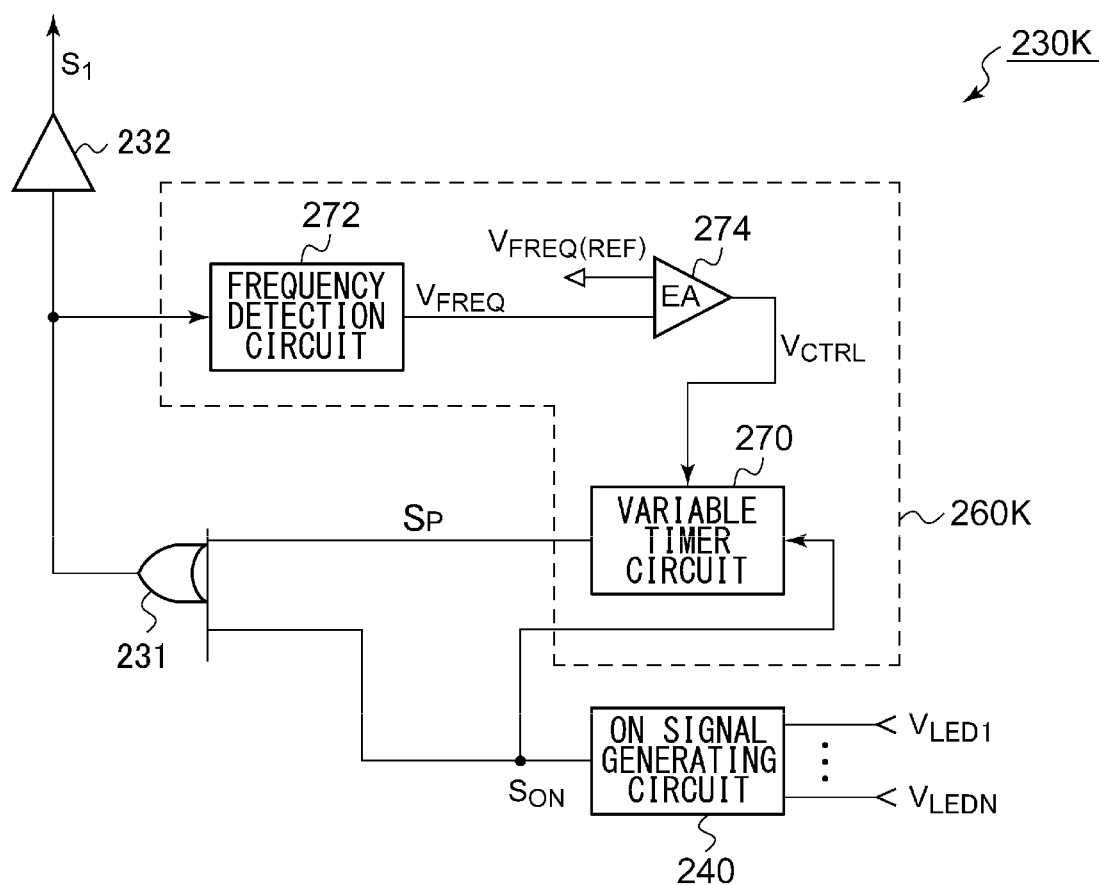
FIG. 14 is a circuit diagram showing a converter controller according to an example 1-6.

FIG. 14 is a circuit diagram showing a converter controller 230K according to an example 1-6. An off signal generating circuit 260K feedback controls the on time $T_{ON}$ so as to maintain the switching frequency at a constant value. A variable timer circuit 270 is configured as a monostable multivibrator that generates the pulse signal $S_P$ that is set to the high level during a period of the on time $T_{ON}$ after the assertion of the on signal $S_{ON}$. The variable timer circuit 270 is configured to change the on time $T_{ON}$ according to a control voltage $V_{CTRL}$.

For example, the variable timer circuit 270 may include a capacitor, a current source that charges the capacitor, and a comparator that compares the voltage across the capacitor with a threshold value. The variable timer circuit 270 is configured such that at least one from among the current amount generated by the current source and the threshold value can be changed according to the control voltage $V_{CTRL}$.

The frequency detection circuit 272 monitors the output Q of the logic circuit 234 or the control pulse $S_1$, and generates a frequency detection signal $V_{FREQ}$ that indicates the switching frequency. An error amplifier 274 amplifiers the difference between the frequency detection signal $V_{FREQ}$ and the reference voltage $V_{FREQ(REF)}$ that defines a target value of the switching frequency, and generates the control voltage $V_{CTRL}$ that corresponds to the difference thus amplified.

With the example 1-6, this arrangement is capable of stabilizing the switching frequency to the target value, thereby allowing the noise countermeasures to be provided in a simple manner.

Figure 15:
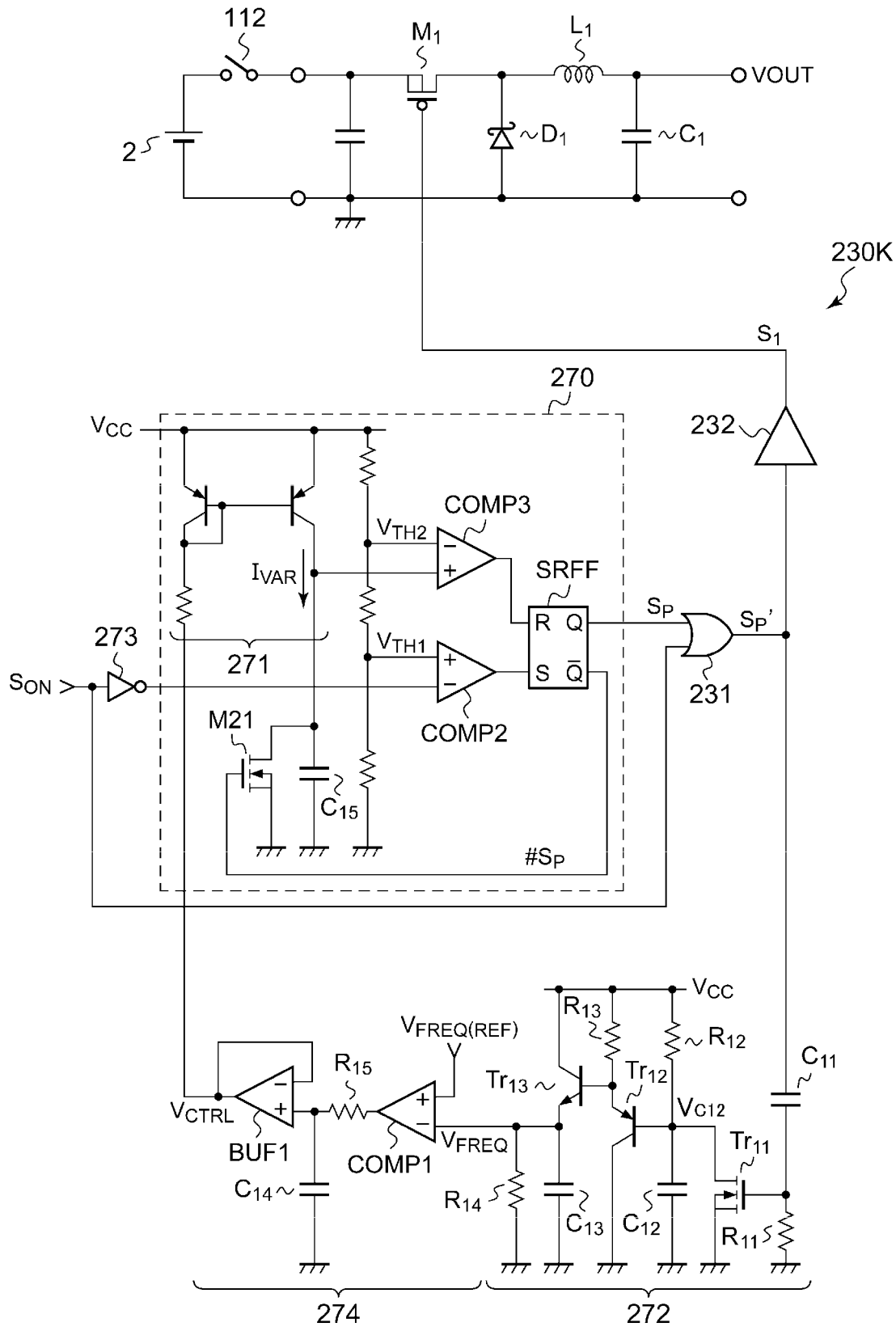
FIG. 15 is a circuit diagram showing a specific configuration of the converter controller shown in FIG. 14.

FIG. 15 is a circuit diagram showing a specific configuration of the converter controller 230K shown in FIG. 14. Description will be made regarding the operation of the frequency detection circuit 272. A combination of a capacitor $C_{11}$ and a resistor $R_{11}$ functions as a high-pass filter, which can be regarded as a differentiating circuit that differentiates the output of the OR gate 231 (or the control pulse $S_1$). Such a high-pass filter can also be regarded as an edge detection circuit that detects an edge of the pulse signal $S_P'$. When the output of the high-pass filter exceeds a threshold value, i.e., when a positive edge occurs in the pulse signal $S_P'$, a transistor $Tr_{11}$ turns on so as to discharge the capacitor $C_{12}$. During the off period of the transistor $Tr_{11}$, the capacitor $C_{12}$ is charged via a resistor $R_{12}$. The voltage $V_{C12}$ across the capacitor $C_{12}$ is configured as a ramp wave in synchronization with the pulse signal $S_P'$. The time length of the slope portion thereof, and the wave height that corresponds to the time length of the slope portion, change according to the period of the pulse signal $S_P'$.

A combination of the transistors $Tr_{12}$ and $Tr_{13}$, the resistors $R_{13}$ and $R_{14}$, and a capacitor $C_{13}$ is configured as a peak hold circuit. The peak hold circuit holds the peak value of the voltage $V_{C12}$ across the capacitor $C_{12}$. The output $V_{FREQ}$ of the peak hold circuit has a correlation with the period of the pulse signal $S_P'$, i.e., the frequency thereof.

A comparator COMP1 compares the frequency detection signal $V_{FREQ}$ with the reference signal $V_{FREQ(REF)}$ that indicates the target frequency. A combination of a resistor $R_{15}$ and a capacitor $C_{14}$ is configured as a low-pass filter. The low-pass filter smooths the output of the comparator COMP1 so as to generate the control voltage $V_{CTRL}$. The control signal $V_{CTRL}$ is output via a buffer BUF1.

Description will be made regarding the variable timer circuit 270. The on signal $S_{ON}$ is inverted by an inverter 273. When the inverted on signal #$S_{ON}$ becomes lower than a threshold value $V_{TH1}$, i.e., when the on signal $S_{ON}$ is set to the high level, the output of a comparator COMP2 is set to the high level. This sets a flip-flop SREF, thereby setting the pulse signal $S_P$ to the high level.

During the high-level period of the pulse signal $S_P$, the transistor $M_{21}$ is turned off. During the off period of the transistor $M_{21}$, a current source 271 generates a variable current $I_{VAR}$ that corresponds to the control voltage $V_{CTRL}$ so as to charge a capacitor $C_{12}$. When the voltage $V_{C15}$ across the capacitor $C_{15}$ reaches a threshold value $V_{TH2}$, the output of the comparator COMP3 is set to the high level. This resets the flip-flop SREF, thereby switching the pulse signal $S_P$ to the low level. As a result, the transistor $M_{21}$ is turned on, thereby initializing the voltage $V_{C15}$ of the capacitor $C_{15}$.

Figure 16:
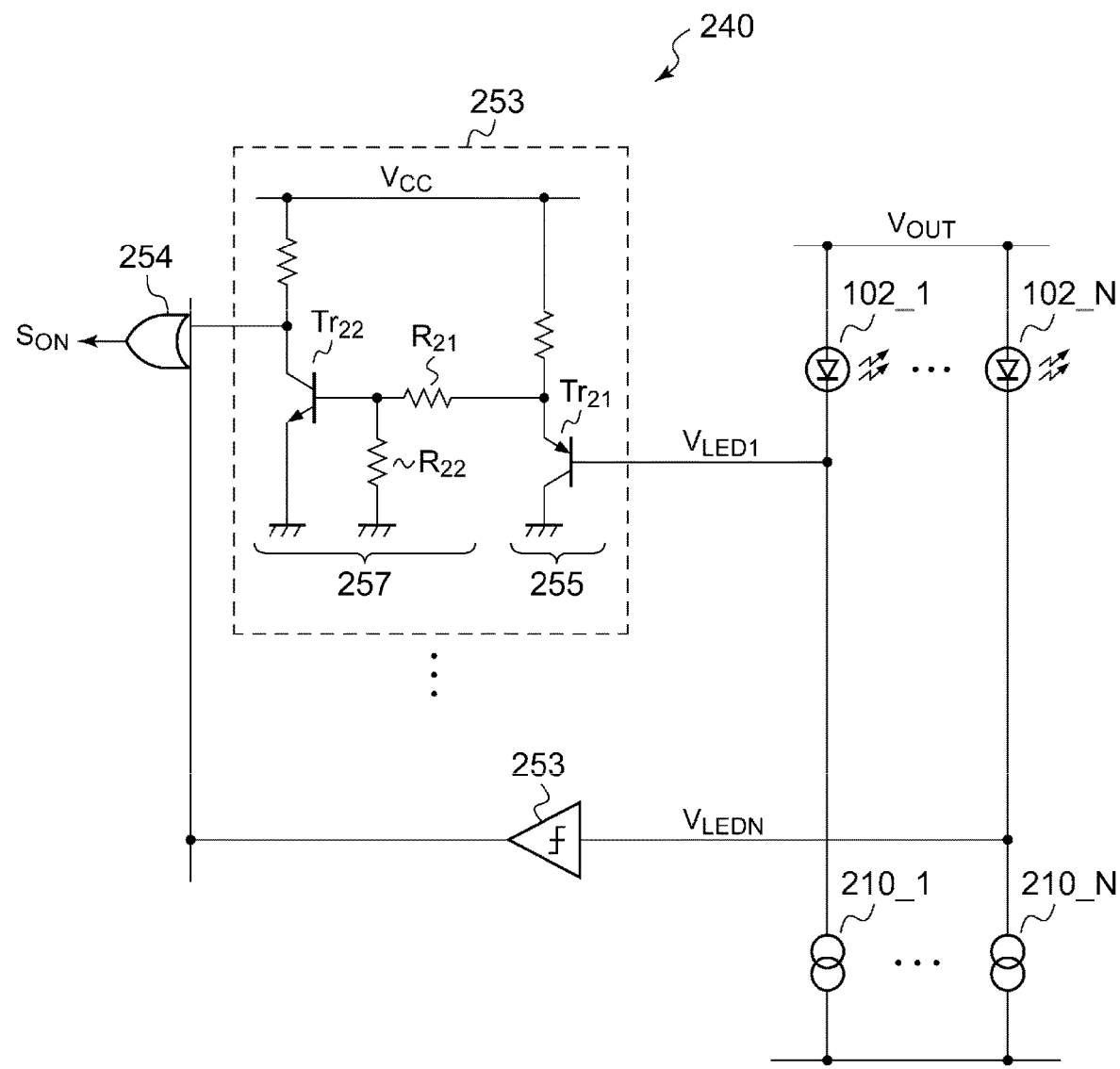
FIG. 16 is a circuit diagram showing a modification of an on signal generating circuit.

FIG. 16 is a circuit diagram showing a modification of the on signal generating circuit 240. In a case in which the comparator 252 is employed as shown in FIG. 7, this arrangement supports high-precision voltage comparison. However, such an arrangement has a tradeoff problem of a large circuit area and high costs. In order to solve such a problem, as shown in FIG. 16, a voltage comparison unit having a simple configuration including a transistor may be employed. A voltage comparison unit 253 includes an emitter follower circuit 255 including a PNP bipolar transistor $Tr_{21}$ and a comparison circuit 257. The output ($V_{LED}+V_{BE}$) of the emitter follower circuit 255 configured as an upstream stage is voltage divided by means of resistors $R_{21}$ and $R_{22}$, and then input to the base of a transistor $Tr_{22}$. When the voltage $V_{LED}$ to be monitored decreases, the base voltage of the transistor $Tr_{22}$ decreases. When the base voltage becomes lower than the on voltage of the bipolar transistor, the current that flows through the transistor $Tr_{22}$ is cut off, which sets the output of the voltage comparison unit 253 to the high level.

FIG. 16 shows an example in which the outputs of the multiple voltage comparison units 253 are input to the OR gate 254. However, the present disclosure is not restricted to such an example. Also, such an OR gate 254 may be omitted. With such an arrangement, the collectors of the transistors $Tr_{22}$ of the multiple voltage comparison units 253 may be coupled so as to form a common collector. Also, a common resistor may be provided between the common collector and the power supply line $V_{CC}$.

Figure 17C:
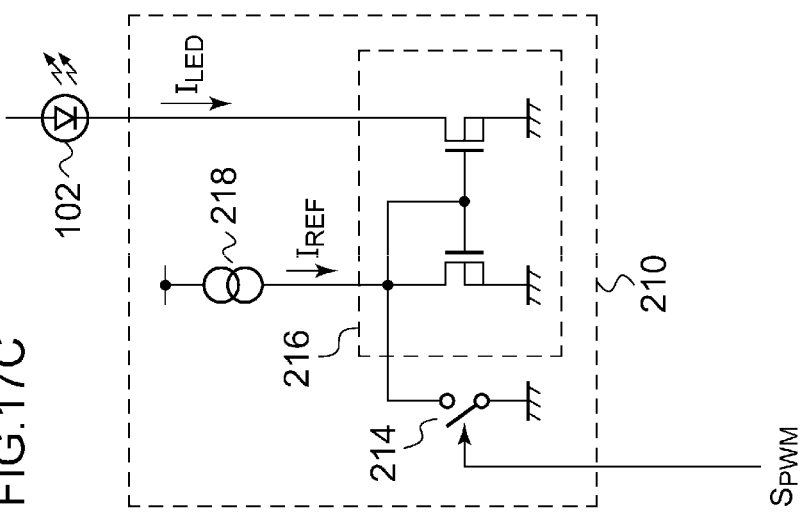
FIG. 17A through 17C are circuit diagrams each showing an example configuration of the current source.
Figure 17B:
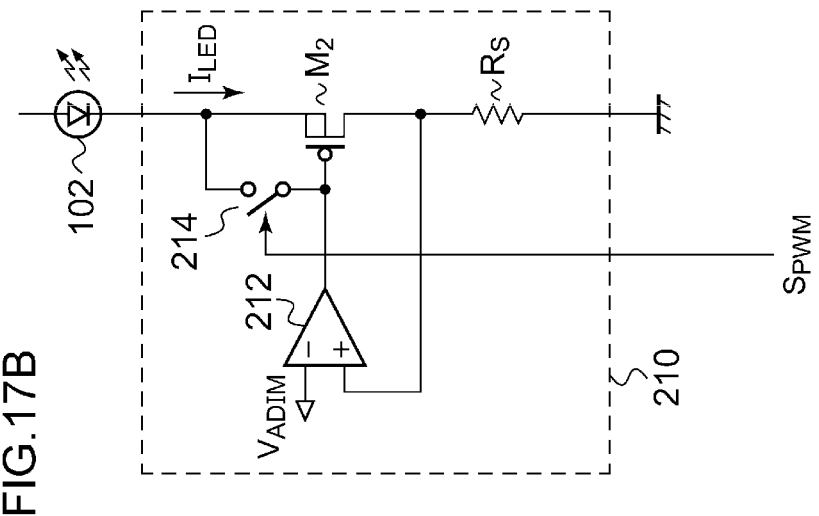
Figure 17A:
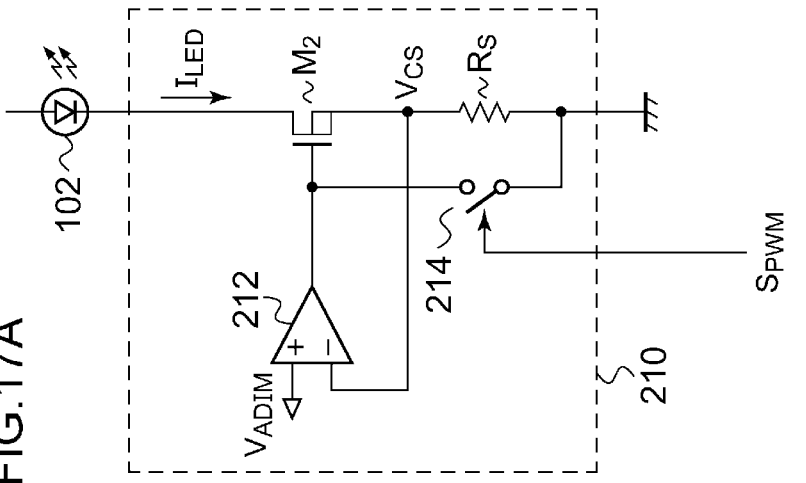

FIGS. 17A through 17C are circuit diagrams each showing an example configuration of the current source 210. The current source 210 shown in FIG. 17A includes a series transistor $M_2$, a sensing resistor $R_S$, and an error amplifier 212. The series transistor $M_2$ and the sensing resistor $R_S$ are provided in series on a path of the driving current $I_{LEDi}$. The error amplifier 212 adjusts the voltage $V_G$ at a control electrode (gate in this example) of the series transistor $M_2$ such that the voltage drop $V_{CS}$ that occurs across the sensing resistor $R_S$ approaches a target voltage $V_{ADIM}$. In this example, the series transistor $M_2$ is configured as an N-type (N-channel) MOS transistor. The error amplifier 212 is arranged such that the reference voltage $V_{ADIM}$ is input to one input thereof (non-inverting input terminal) and such that the voltage $V_{CS}$ (voltage drop that occurs across the sensing resistor $R_S$) at a connection node that couples the series transistor $M_2$ and the sensing resistor $R_S$ is input to the other input thereof (inverting input terminal). The error amplifier 212 provides feedback control such that $V_{CS}$ approaches $V_{ADIM}$, thereby stabilizing the driving current $I_{LED}$ with $I_{LED(REF)}=V_{ADIM}/R_S$ as its target value.

The current source 210 further includes a switch (dimming switch) 214 for PWM dimming. The dimming switch 214 is controlled according to a PWM signal $S_{PWM}$ generated by the dimming controller 116. When the dimming switch 214 is turned off, the driving current $I_{LED}$ flows through the current source 210. When the dimming switch 214 is turned on, the series transistor $M_2$ is turned off, which disconnects the driving current $I_{LED}$. The dimming switch 214 is switched at a high speed at a PWM frequency of 60 Hz or more. Furthermore, by adjusting the duty ratio of the PWM frequency, the semiconductor light source 102 is subjected to PWM dimming control.

In the current source 210 shown in FIG. 17B, the series transistor is configured as a P-channel MOSFET. The error amplifier 212 is configured to have an input polarity that is the reverse of that shown in FIG. 17A.

In a case of employing the current source 210 shown in FIG. 17A or 17B, the bottom limit voltage $V_{BOTTOM}$ may preferably be determined as represented by the following Expression. Here, $\Delta V$ represents an appropriate margin.

$$V_{BOTTOM}=R_S \times I_{LED}+V_{SAT}+\Delta V$$

The current source 210 shown in FIG. 17C has the same configuration as that shown in FIG. 5, including a current mirror circuit 216 and a reference current source 218. The current mirror circuit 216 multiplies the reference current $I_{REF}$ generated by the reference current source 218 by a predetermined coefficient determined by a mirror ratio, so as to generate the driving current $I_{LED}$. In a case of employing the current source 210 shown in FIG. 17C, the bottom limit voltage $V_{BOTTOM}$ may preferably be determined as represented by the following Expression.

$$V_{BOTTOM} = V_{SAT} + \Delta V$$

Here, $V_{SAT}$ represents the saturation voltage of the current mirror circuit, and $\Delta V$ represents an appropriate margin.

Embodiment 2

Figure 18:
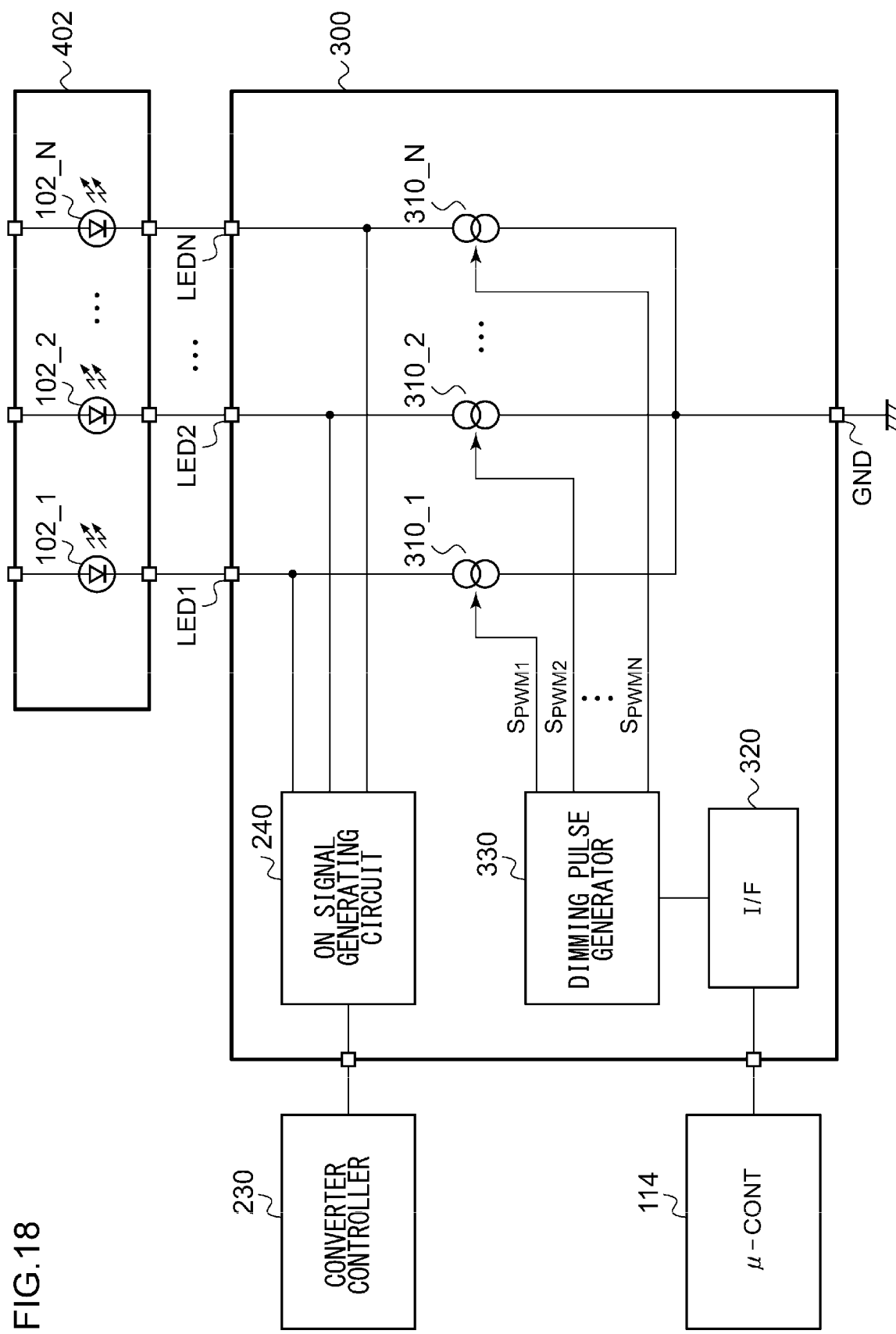
FIG. 18 is a circuit diagram showing a current driver IC and a peripheral circuit thereof according to an embodiment 2.

Next, description will be made regarding a light source with an integrated driver. The multiple current sources 210 may be integrated on a single semiconductor chip, which will be referred as a "current driver IC (Integrated Circuit)" hereafter. FIG. 18 is a circuit diagram showing a current driver IC 300 and a peripheral circuit thereof according to an embodiment 2. In addition to multiple current sources 310_1 through 310_N, the current driver IC 300 includes an interface circuit 320 and a dimming pulse generator 330.

The multiple current sources 310_1 through 310_N are configured to switch independently between the on state and the off state according to PWM signals $S_{PWM1}$ through $S_{PWMN}$, respectively. The current sources 310_1 through 310_N are respectively coupled to the corresponding semiconductor light sources 102_1 through 102_N in series via cathode pins LED1 through LEDN.

The interface circuit 320 receives multiple items of control data $D_1$ through $D_N$ from an external microcontroller (processor) 114. The kind of the interface is not restricted in particular. For example, a Serial Peripheral Interface (SPI) or I²C interface may be employed. The multiple items of control data $D_1$ through $D_N$ respectively indicate the on/off duty ratios of the multiple current sources 310_1 through 310_N, which are updated at a first time interval $T_1$. The first time interval $T_1$ is set to on the order of 20 ms to 200 ms. For example, the first time interval $T_1$ is set to 100 ms.

The dimming pulse generator 330 generates the multiple PWM signals $S_{PWM1}$ through $S_{PWMN}$ for the multiple current sources 310_1 through 310_N based on the multiple items of control data $D_1$ through $D_N$. In the embodiment 1 (FIG. 2), the microcontroller 114 generates the multiple PWM signals $S_{PWM1}$ through $S_{PWMN}$. In the embodiment 2 (FIG. 18), the current driver IC 300 has a built-in function of generating the multiple PWM signals $S_{PWM1}$ through $S_{PWMN}$.

The duty ratio of the i-th PWM signal $S_{PWMi}$ is gradually changed at a second time interval $T_2$ that is shorter than the first time interval $T_1$ from the corresponding control data $D_i$ value before updating to the updated value thereof (which will be referred to as the "gradual-change mode"). The second time interval $T_2$ is set to a value on the order of 1 ms to 10 ms. For example, the second time interval $T_2$ is set to 5 ms.

The dimming pulse generator 330 is capable of supporting a non-gradual-change mode in addition to the gradual-change mode. In the non-gradual-change mode, the duty ratio of the i-th PWM signal $S_{PWMi}$ is allowed to be immediately changed from the corresponding control data $D_i$ value before updating to the updated value thereof.

The dimming pulse generator 330 may preferably be configured to dynamically switch its mode between the non-gradual-change mode and the gradual-change mode according to the settings received from the microcontroller 114. Preferably, the dimming pulse generator 330 is configured to dynamically switch its mode between the non-gradual-change mode and the gradual-change mode for each channel (for each dimming pulse). The setting data that indicates the mode may be appended to the control data $D_i$.

A part of or the whole of the on signal generating circuit 240 may be integrated on the current driver IC 300. The part of the on signal generating circuit 240 to be integrated may preferably be determined according to the circuit configuration of the on signal generating circuit 240, and specifically, may preferably be determined so as to reduce the number of lines that couple the converter controller 230 and the current driver IC 300. As shown in FIG. 18, in a case in which the entire on signal generating circuit 240 is integrated on the current driver IC 300, such an arrangement requires only a single line between the converter controller 230 and the current driver IC 300, which is used to transmit the on signal $S_{ON}$. On the other hand, in a case of employing the on signal generating circuit 240G shown in FIG. 10, and in a case in which the minimum value circuit 256 is integrated on the current driver IC 300, such an arrangement requires only a single line between the converter controller 230 and the current driver IC 300, through which the minimum voltage $V_{MIN}$ propagates.

Figure 19:
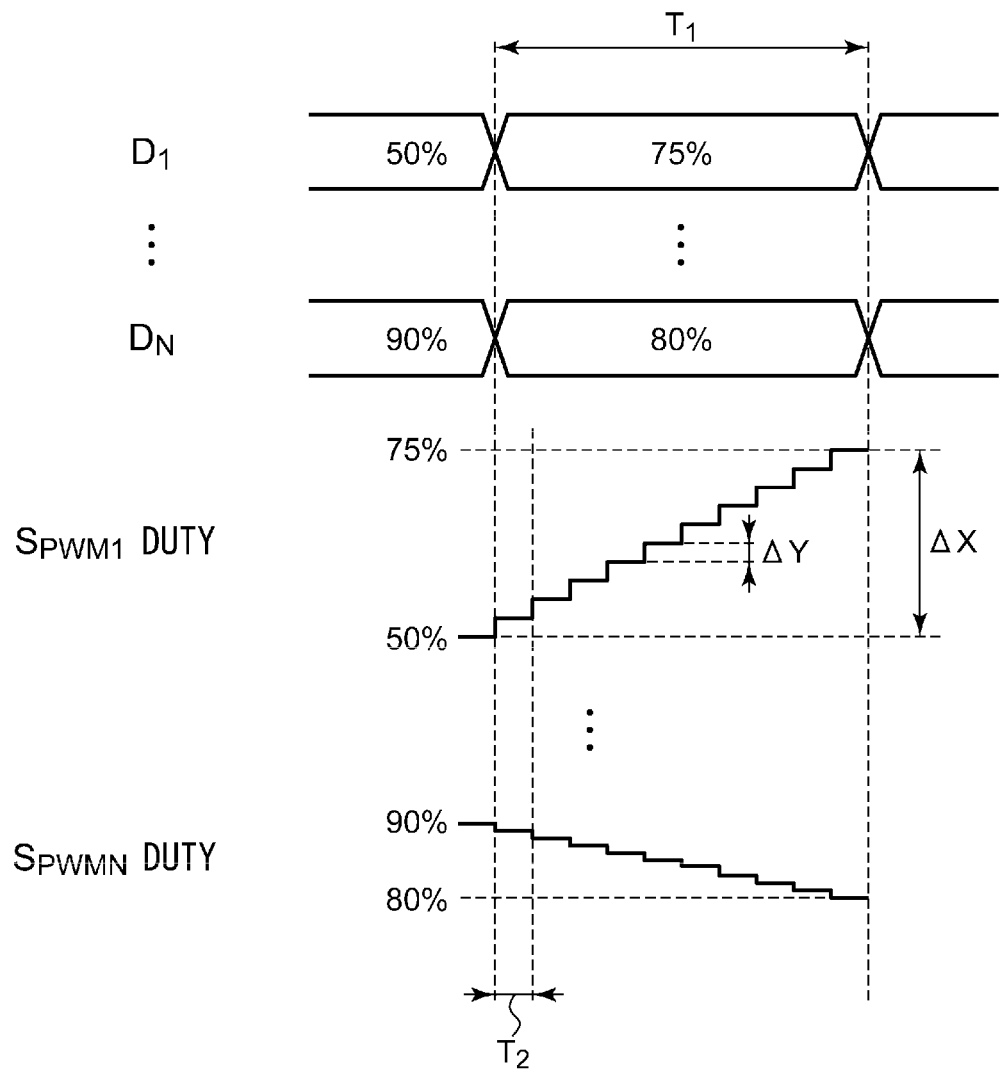
FIG. 19 is an operation waveform diagram showing the operation of the current driver IC.

Next, description will be made regarding the operation of the current driver IC 300. FIG. 19 is an operation waveform diagram showing the operation of the current driver IC 300. Here, description will be made assuming that the duty ratio of the PWM signal is changed linearly. For example, in a case in which $T_1$=100 ms, and $T_2$=5 ms, the duty ratio may preferably be changed in a stepwise manner with 20 steps. With the difference between the control data value before updating and the control data value after updating as $\Delta X$ %, the duty ratio of the PWM signal is changed in a stepwise manner with steps of $\Delta Y=(\Delta X/20)$%.

The above is the operation of the current driver IC 300. The advantages of the current driver IC 300 can be clearly understood in comparison with a comparison technique. If the current driver IC 300 does not have the function of gradually changing the duty ratio, the microcontroller 114 must update the control data $D_1$ through $D_N$ that each indicate the duty ratio at the second time interval $T_2$. In a case in which the number of channels N of the semiconductor light sources 102 exceeds several dozen to 100, such an arrangement requires a high-performance microcontroller, i.e., a high-cost microcontroller, configured as the microcontroller 114. Furthermore, such an arrangement requires high-speed communication between the microcontroller 114 and the current driver IC 300, thereby leading to the occurrence of a noise problem.

In contrast, with the current driver IC 300 according to the embodiment 2, this arrangement allows the rate at which the microcontroller 114 updates the control data $D_1$ through $D_N$ to be reduced. This allows the performance required for the microcontroller 114 to be reduced. Furthermore, this allows the communication speed between the microcontroller 114 and the current driver IC 300 to be reduced, thereby solving the noise problem.

The first time interval $T_1$ may preferably be configured to be variable. In a situation in which there is only a small change in the duty ratio, the first time interval $T_1$ is increased so as to reduce the data communication amount, thereby allowing power consumption and noise to be reduced.

FIG. 19 shows an example in which the duty ratio is changed linearly. Also, the duty ratio may be changed according to a curve function such as a quadratic function or an exponential function. In a case of employing such a quadratic function, this arrangement provides natural dimming control with less discomfort.

As shown in FIG. 18, the multiple semiconductor light sources 102_1 through 102_N may be integrated on a single semiconductor chip (die) 402. Furthermore, the semiconductor chip 402 and the current driver IC 300 may be housed in a single package in the form of a module.

Figure 20:
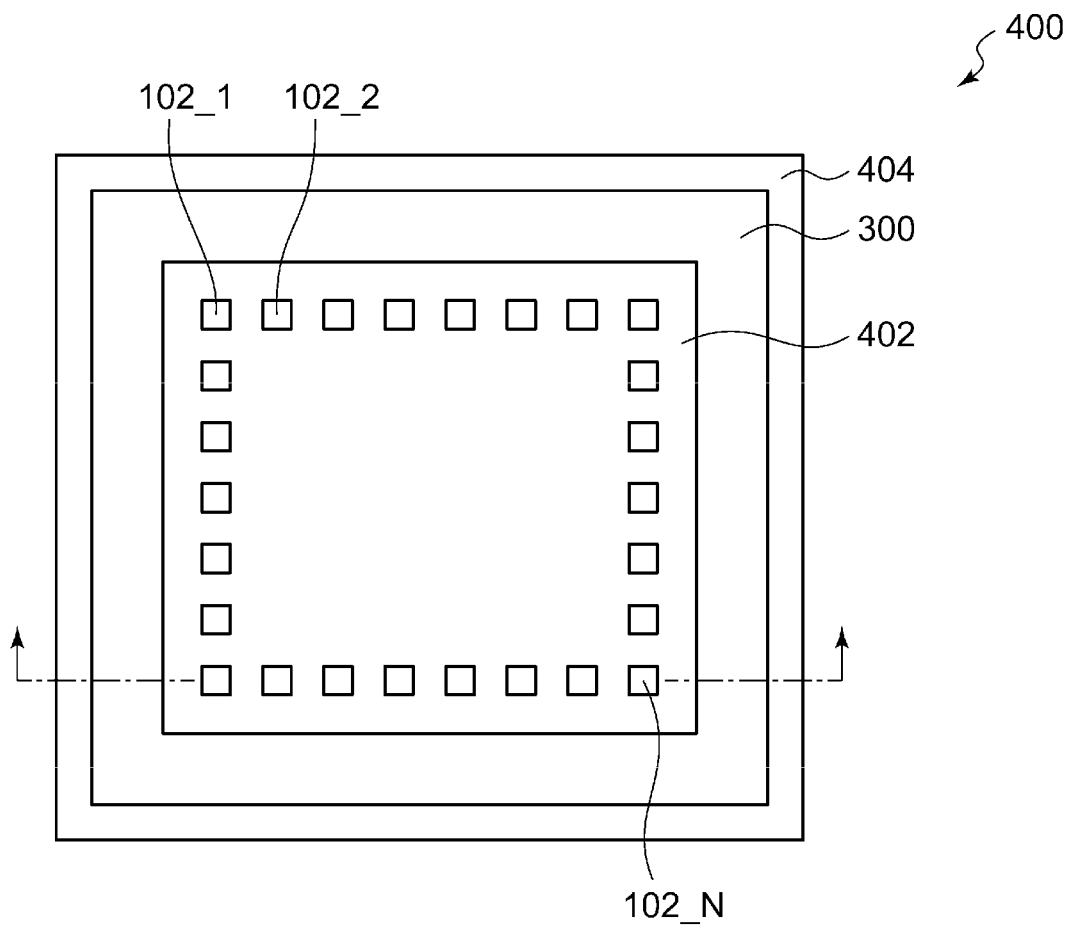
FIG. 20 shows a plan view and a cross-sectional view of an integrated-driver light source.
Figure 20:
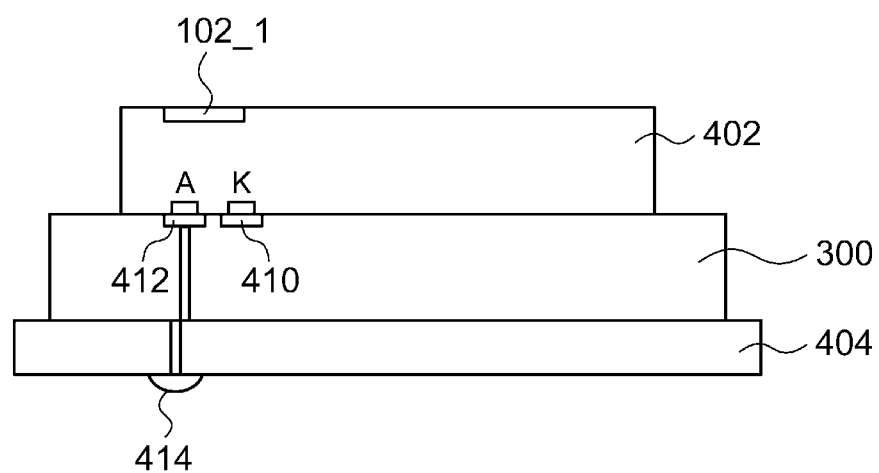

FIG. 20 shows a plan view and a cross-sectional view of the integrated-driver light source 400. The multiple semiconductor light sources 102 are formed in a matrix on the front face of the semiconductor chip 402. The back face of the semiconductor chip 402 is provided with pairs of back-face electrodes A and K that each correspond to a pair of an anode electrode and a cathode electrode of each of the multiple semiconductor light sources 102. In this drawing, only a single connection relation is shown for the semiconductor light source 102_1.

The semiconductor chip 402 and the current driver IC 300 are mechanically joined and electrically coupled. The front face of the current driver IC 300 is provided with front-face electrodes 410 (LED1 through LEDN in FIG. 18) to be respectively coupled to the cathode electrodes K of the multiple semiconductor light sources 102 and front-face electrodes 412 to be respectively coupled to the anode electrodes A of the multiple semiconductor light sources 102. Each front-face electrode 412 is coupled to a corresponding bump (or pad) 414 provided to a package substrate configured as a back face of the current driver IC 300. Also, an unshown interposer may be arranged between the semiconductor chip 402 and the current driver IC 300.

The kind of the package of the integrated-driver light source 400 is not restricted in particular. As the package of the integrated-driver light source 400, a Ball Grid Array (BAG), Pin Grid Array (PGA), Land Grid Array (LGA), Quad Flat Package (QFP), or the like, may be employed.

In a case in which the semiconductor light sources 102 and the current driver IC 300 are each configured as a separate module, a countermeasure may preferably be provided in which a heat dissipation structure or the like is attached to each module. In contrast, with the integrated-driver light source 400 as shown in FIG. 20, there is a need to release the sum total of heat generated by the light sources 102 and the current sources 210. Accordingly, such an arrangement has the potential to require a very large heat dissipation structure. However, by employing the lighting circuit 200 according to the embodiment 2, this arrangement is capable of suppressing heat generated by the current sources 210. This allows the size of the heat dissipation structure to be attached to the integrated-driver light source 400 to be reduced.

Modification 1-1

Description will be made regarding a modification relating to the embodiments 1 and 2.

A desired transistor such as the series transistor $M_2$ may be configured as a bipolar transistor. In this case, the base corresponds to the gate, the emitter corresponds to the source, and the collector corresponds to the drain.

Modification 1-2

Description has been made in the embodiments regarding an arrangement in which the switching transistor $M_1$ is configured as a P-channel MOSFET. Also, an N-channel MOSFET may be employed. In this case, a bootstrap circuit may be provided as an additional component. Instead of such a MOSFET, an Insulated Gate Bipolar Transistor (IGBT) or a bipolar transistor may be employed.

Modification 1-3

Figure 21:
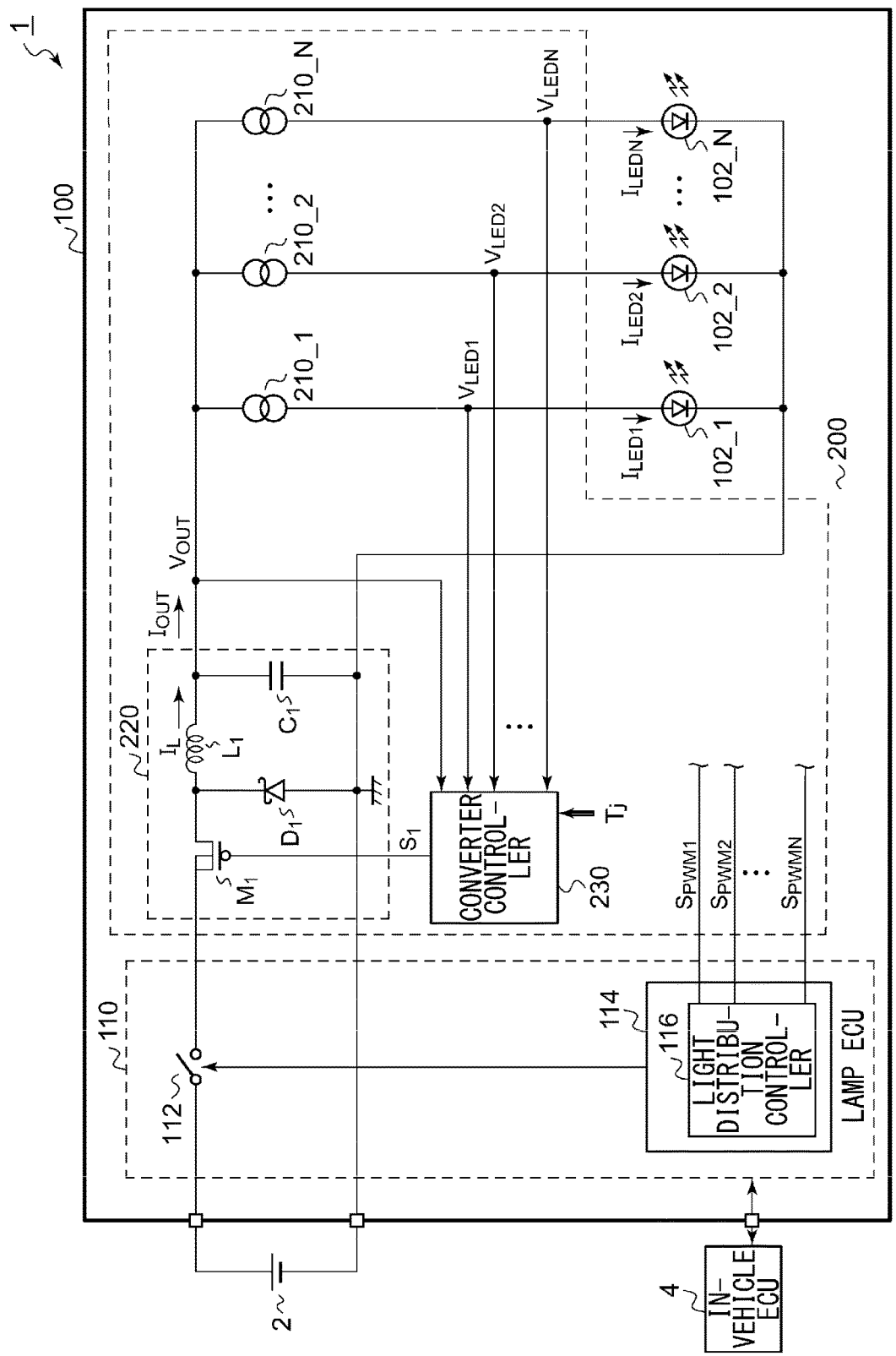
FIG. 21 is a circuit diagram showing an automotive lamp according to a modification 1-3.
Figure 22:
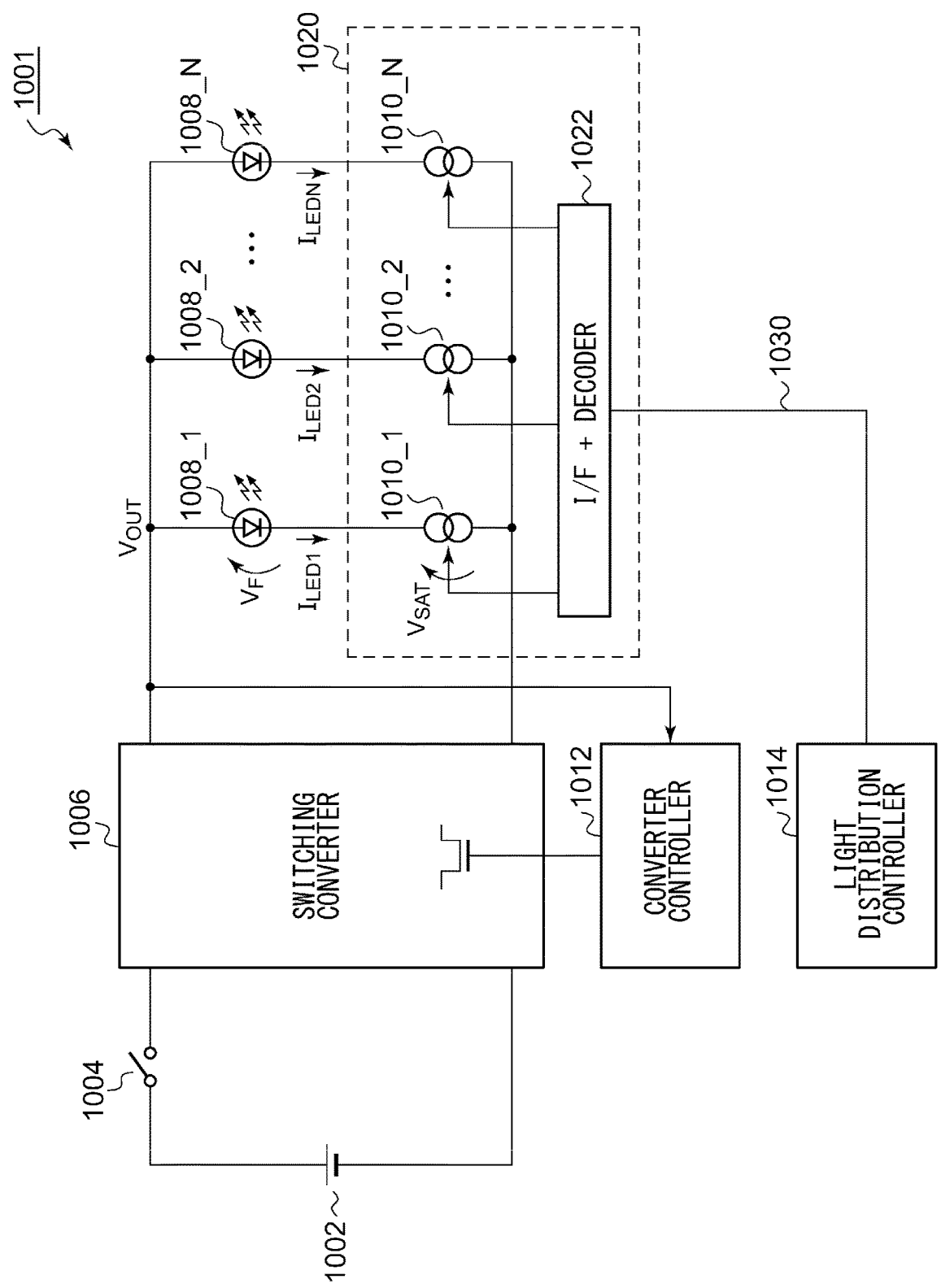
FIG. 22 is a diagram showing another example configuration of the lamp system.
Figure 23:
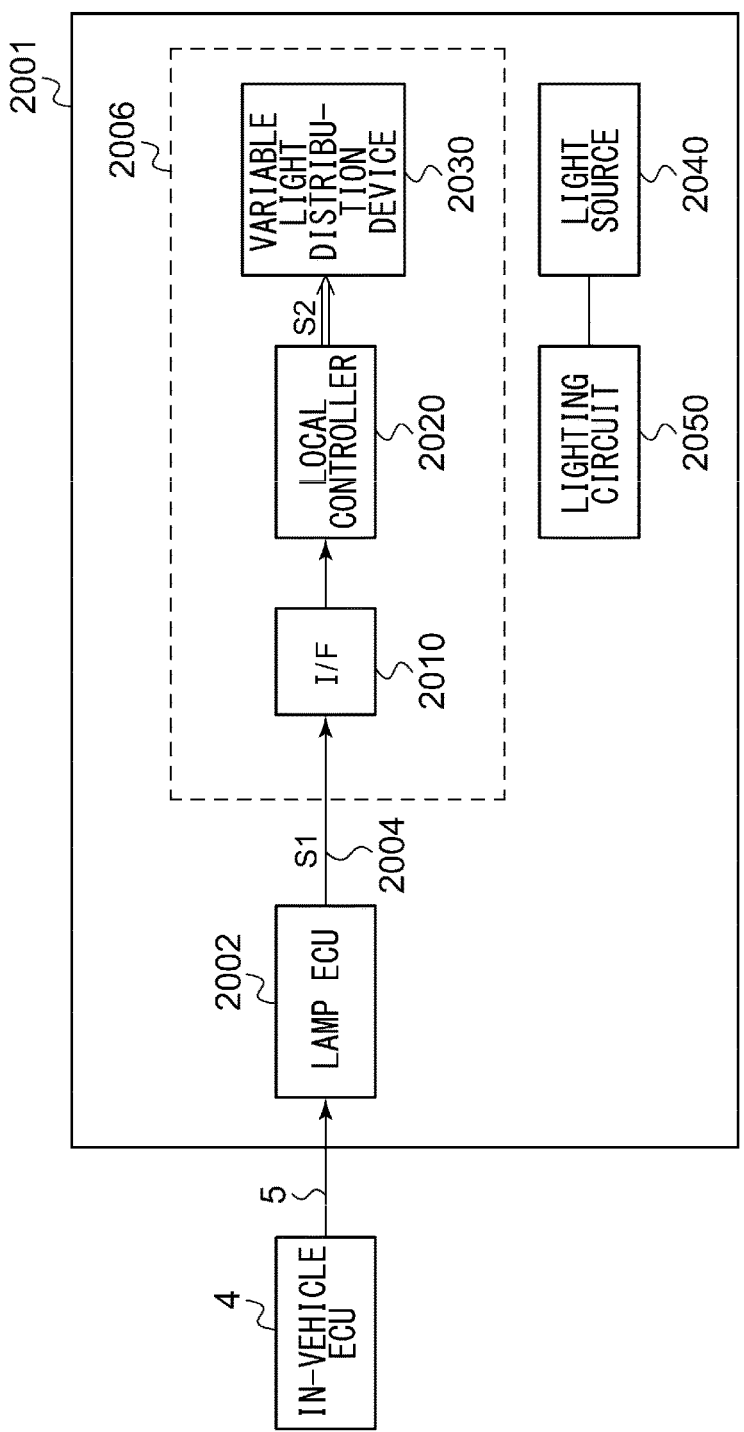
FIG. 23 is a diagram showing another example configuration of the automotive lamp.

Description has been made in the embodiments regarding an arrangement in which the current source 210 is configured as a sink circuit, and is coupled to the cathode of the corresponding semiconductor light source 102. However, the present disclosure is not restricted to such an arrangement. FIG. 21 is a circuit diagram showing an automotive lamp 100 according to a modification 1-3. In this modification, the cathodes of the semiconductor light sources 102 are coupled so as to form a common cathode. Furthermore, each current source 210 configured as a source circuit is coupled to the anode side of the corresponding semiconductor light source 102. Each current source 210 may be configured by geometrically reversing the configuration of the current source shown in FIG. 5 or 17. The converter controller 230 controls the switching converter 220 based on the relation between the voltages $V_{CS}$ that occur across each current source 210 and the bottom limit voltage $V_{BOTTOM}$.

Embodiment 3

Figure 24:
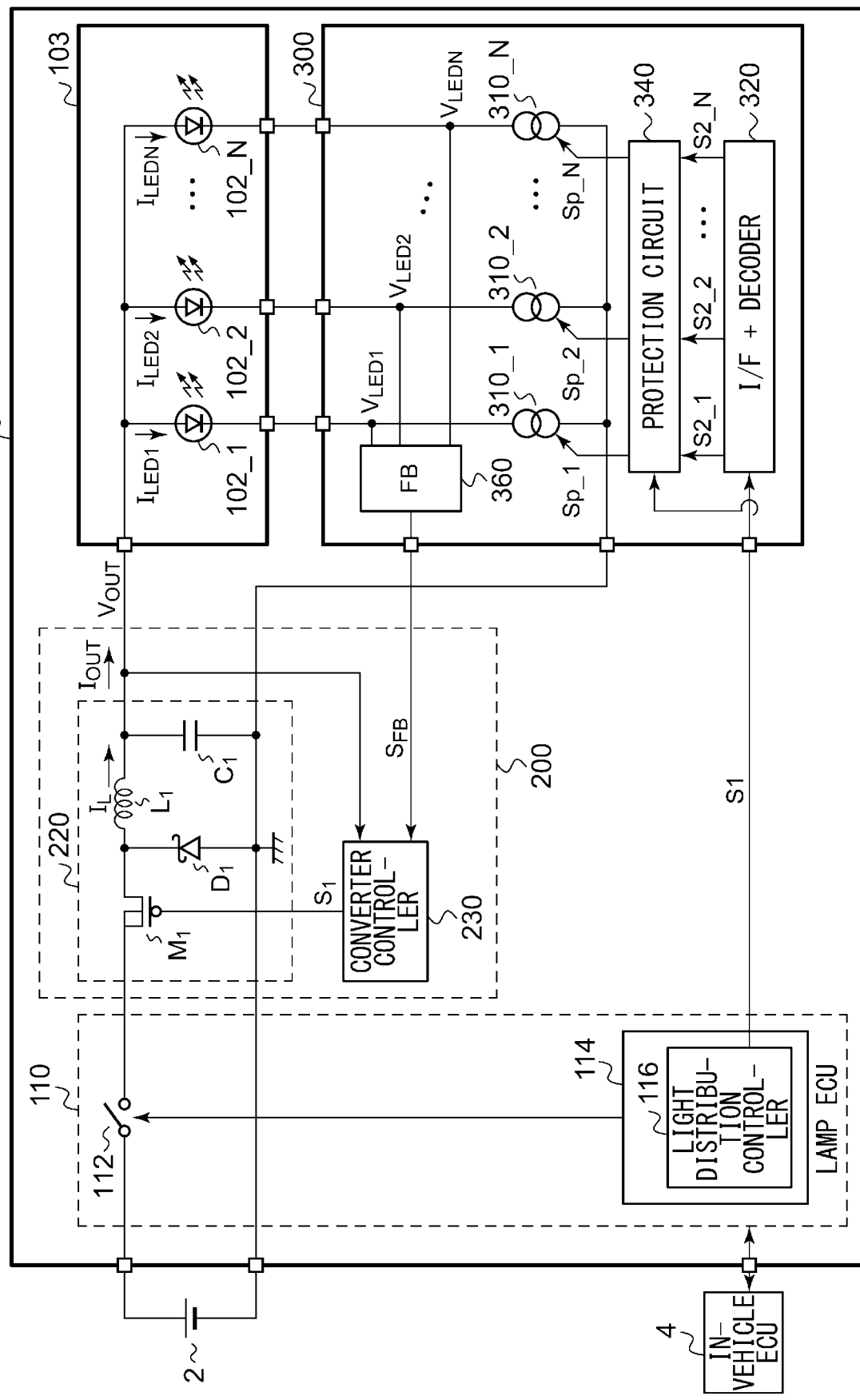
FIG. 24 is a block diagram showing a lamp system including the automotive lamp according to an embodiment 3.

FIG. 24 is a block diagram showing a lamp system 1 including the automotive lamp 100 according to an embodiment 3. The lamp system 1 includes a battery 2, an in-vehicle Electronic Control Unit (ECU) 4, and an automotive lamp 100. The automotive lamp 100 is configured as a variable light distribution headlamp having an ADB function. The automotive lamp 100 generates a light distribution according to a control signal received from the in-vehicle ECU 4.

The automotive lamp 100 includes multiple (N≥2) semiconductor light sources 102_1 through 102_N, a lamp ECU 110, a lighting circuit 200, and a current driver IC 300. Each semiconductor light source 102 may preferably be configured using an LED. Also, various kinds of light-emitting elements such as an LD, organic EL, or the like, may be employed. Each semiconductor light source 102 may include multiple light-emitting elements coupled in series and/or coupled in parallel. It should be noted that the number of the semiconductor light sources 102, i.e., N, is not restricted in particular. Specifically, the number N is at least several dozen or more, and is preferably several hundred to several thousand. Also, the number of channels, i.e., N, may be on the order of tens of thousands. The multiple semiconductor light sources 102_1 through 102_N are integrated on a single semiconductor chip (LED chip 103).

The lamp ECU 110 includes a switch 112 and a microcontroller 114. The microcontroller (processor) 114 is coupled to the in-vehicle ECU 4 via a bus such as a Controller Area Network (CAN) or Local Interconnect Network (LIN) or the like. This allows the microcontroller 114 to receive various kinds of information such as a turn-on/turn-off instruction, etc. The microcontroller 114 turns on the switch 112 in response to a turn-on instruction received from the in-vehicle ECU 4. In this state, a power supply voltage (battery voltage $V_{BAT}$) is supplied from the battery 2 to the lighting circuit 200.

Furthermore, the microcontroller 114 receives a control signal for indicating the light distribution pattern from the in-vehicle ECU 4, and controls the lighting circuit 200. Also, the microcontroller 114 may receive information that indicates the situation ahead of the vehicle from the in-vehicle ECU 4, and may autonomously generate the light distribution pattern based on the information thus received.

The current driver IC 300 supplies the driving currents $I_{LED1}$ through $I_{LEDN}$ to the multiple semiconductor light sources 102_1 through 102_N. The current driver IC 300 is configured to capable of independently turning on and off the driving current $I_{LED}$ for each semiconductor light source 102.

The lighting circuit 200 supplies the driving voltage $V_{OUT}$ to the LED chip 103 and the current driver IC 300. The lighting circuit 200 may include the switching converter 220 and the converter controller 230. In this example, the switching converter 220 is configured as a step-down converter. However, the topology of the switching converter 220 is not restricted in particular.

The current driver IC 300 includes multiple current sources 310_1 through 310_N, an interface circuit 320, a protection circuit 340, and a feedback circuit 360.

The current source 310_# ("#" represents 1 through N) is coupled in series with the corresponding one 102_# from among the multiple semiconductor light sources 102_1 through 102_N. The current source 310_# is configured to be capable of switching its on/off state according to a control input Sp_#. When the current source 310_# is set to the on state, the current source 310_# generates a driving current $I_{LED\#}$. When the current source 310_# is set to the off state, the driving current $I_{LED\#}$ is disconnected. For example, when the control input Sp_# is set to the high level, the current source 310_# is set to the on state. Conversely, when the control input Sp_# is set to the low level, the current source 310_# is set to the off state.

Figure 25:
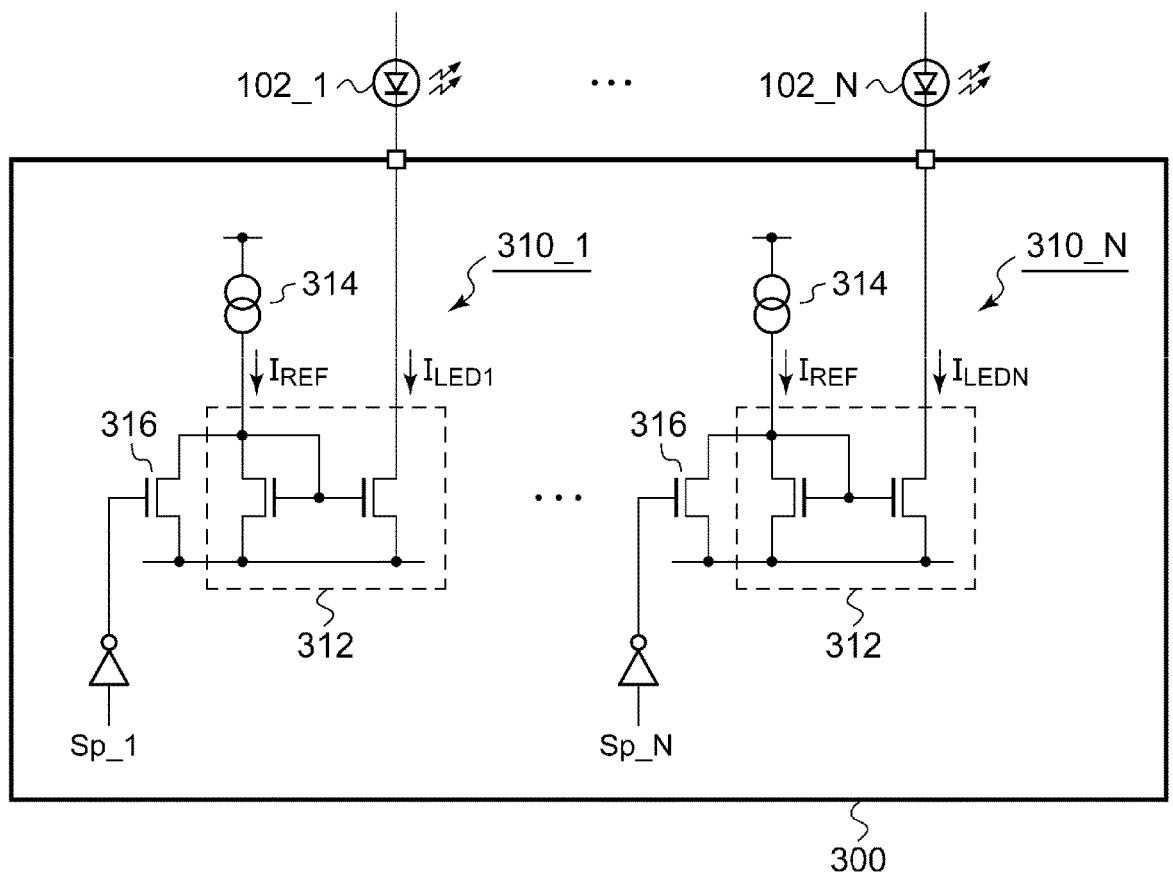
FIG. 25 is a circuit diagram showing an example configuration of multiple current sources.

FIG. 25 is a circuit diagram showing an example configuration of the multiple current sources 310. Each current source 310 includes a current mirror circuit 312, a reference current source 314, and a dimming switch 316. The reference current source 314 generates a reference current $I_{REF}$. The current mirror circuit 312 copies the reference current $I_{REF}$, so as to generate a driving current $I_{LED}$. The dimming switch 316 is arranged between the gate and the source of the current mirror circuit 312. When the dimming switch 316 is turned on, the operation of the current mirror circuit 312 is suspended, thereby disconnecting the driving current $I_{LED}$. An inverter 318 inverts the control input Sp, and inputs the inverted control input to the gate of the dimming switch 316. It should be noted that, in a case of employing a negative logic system, the inverter 318 may be omitted, and the semiconductor light source 102 may be turned on when the control input Sp is set to the low level.

Returning to FIG. 24, the feedback circuit 360 outputs a feedback signal $S_{FB}$ to the converter controller 230 according to the voltages $V_{LED1}$ through $V_{LEDN}$ that respectively occur across the multiple current sources 310_1 through 310_N. For example, the feedback circuit 360 is designed according to a control method of the converter controller 230.

The converter controller 230 may support a ripple control operation. In this case, when the lowest voltage from among the voltages $V_{LED1}$ through $V_{LEDN}$ that respectively occur across the current sources 310_1 through 310_N decreases to a predetermined voltage (bottom limit voltage $V_{MIN}$), the feedback circuit 360 may assert the feedback signal $S_{FB}$. The converter controller 230 may turn on the switching transistor $M_1$ in response to the assertion of the feedback signal $S_{FB}$.

The converter controller 230 may support a Pulse Width Modulation (PWM) control operation. The feedback circuit 360 may amplify the difference between a predetermined reference voltage $V_{REF}$ and the lowest voltage from among the voltages $V_{LED1}$ through $V_{LEDN}$ that respectively occur across the current sources 310_1 through 310_N, so as to generate the feedback signal $S_{FB}$ in the form of an analog signal. Also, the converter controller 230 may generate a PWM signal having a duty ratio that corresponds to the voltage level of the feedback signal $S_{FB}$, so as to drive the switching transistor $M_1$.

In a case in which the feedback circuit 360 is built into the current driver IC 300, this allows the number of feedback paths to be reduced to one, thereby allowing the number of lines to be reduced.

The interface circuit 320 is coupled to the microcontroller (processor) 114, and receives a control signal S1 that indicates the on/off state of each of the multiple semiconductor light sources 102_1 through 102_N. The interface circuit 320 has a decoder function of converting the control signal S1 thus received into multiple individual control signals S2_1 through S2_N. The multiple individual control signals S2_1 through S2_N determine the on/off state of each of the multiple current sources 310_1 through 310_N.

The protection circuit 340 monitors the communication between the microcontroller 114 and the interface circuit 320. In a normal state, the individual control signals S2_1 through S2_N, which are generated based on the control signal S1, are supplied to the respective current sources 310_1 through 310_N as they are. When the protection circuit 340 has detected an abnormal state, the protection circuit 340 forcibly sets the multiple current sources 310_1 through 310_N to a predetermined state. Specifically, the protection circuit 340 replaces the control inputs Sp_1 through Sp_N, which are to be supplied to the current sources 310_1 through 310_N, with a set of predetermined values independent of the control signal S1 (individual control signals S2_1 through S2_N).

Figure 26:
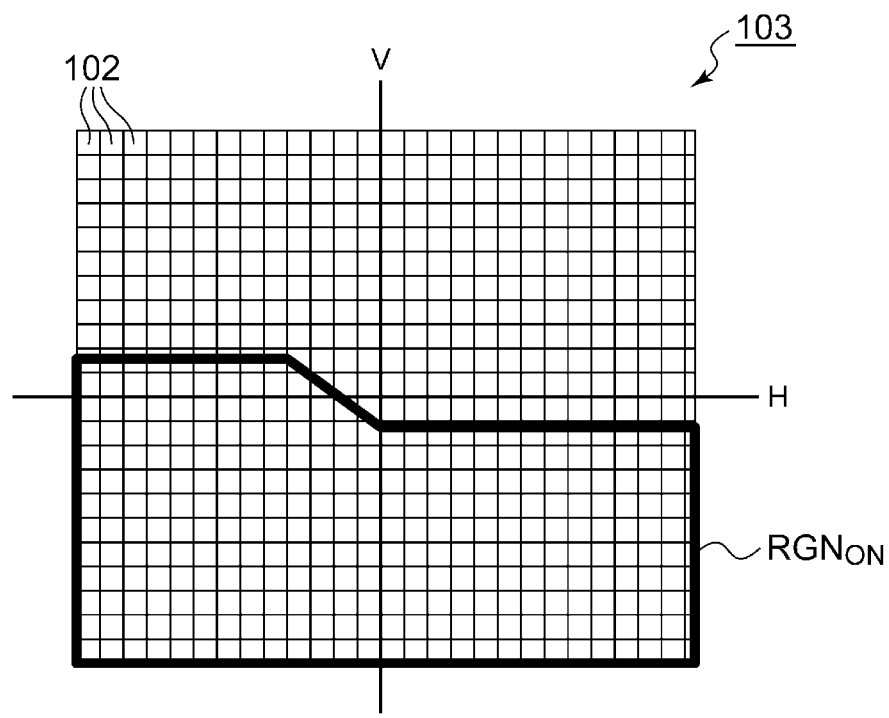
FIG. 26 is a plan view of an LED chip.

For example, the predetermined state may correspond to a low-beam light distribution. FIG. 26 is a plan view of the LED chip 103. The LED chip 103 is configured as an array of the multiple semiconductor light sources 102 arranged in a matrix form. Each semiconductor light source 102 corresponds to a pixel. A region $RGN_{ON}$ to be turned on so as to generate the low-beam light distribution is surrounded by the heavy line. When judgment has been made that an abnormal state has occurred, the multiple semiconductor light sources 102 included in the region $RGN_{ON}$ are forcibly turned on. The multiple semiconductor light sources 102 included in a region to be turned off for the low-beam light distribution are forcibly turned off when judgement has been made that an abnormal state has occurred.

Figure 27:
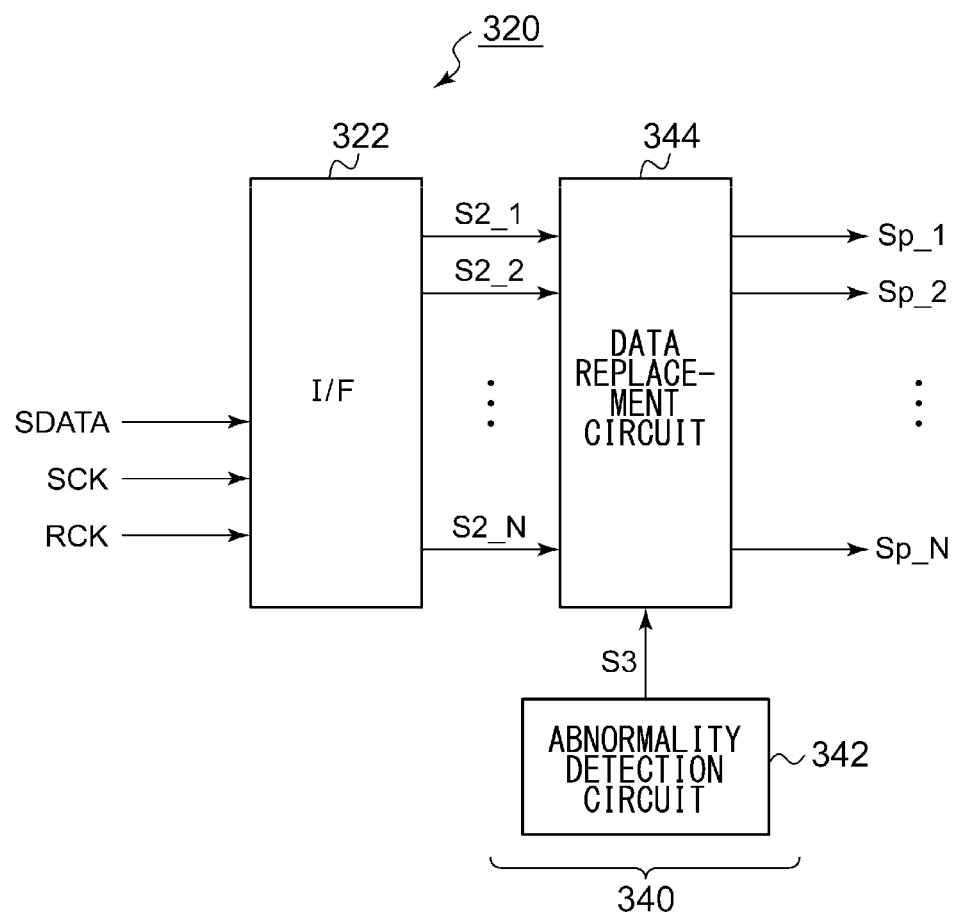
FIG. 27 is a block diagram showing an example configuration of an interface circuit and a protection circuit.

FIG. 27 is a block diagram showing an example configuration of the interface circuit 320 and the protection circuit 340. For example, the interface circuit 320 may include a shift register 322 with an output latch. In this case, the interface circuit 320 and the light distribution controller 116 are coupled via three lines, i.e., an SDATA line, SCK line, and RCK line.

The shift register 322 with an output latch includes an N-bit shift register configured as an input stage and an N-bit storage register configured as an output stage. The input-stage shift register acquires serial data SDATA in synchronization with the SCK signal. Furthermore, the value acquired by the shift register is copied to the storage register, and the value is updated, in response to a positive edge of the RCK signal. The values stored in the storage register are output as the individual control signals S2_1 through S2_N.

The protection circuit 340 includes an abnormal state detection circuit 342 and a data replacement circuit 344. The abnormal state detection circuit 342 monitors at least one from among the input signals of the interface circuit 320 (SDATA, SCK, RCK, in this example), in order to detect the occurrence of an abnormal state in the communication. For example, when there is no change in a signal to be monitored for a predetermined period of time, the interface circuit 320 may judge that an abnormal state has occurred. When judgement has been made that an abnormal state has occurred, an abnormal state detection signal S3 is asserted.

When the abnormal state detection signal S3 is negated, the data replacement circuit 344 outputs the individual control signals S2_1 through S2_N as they are. When the abnormal state detection signal S3 is asserted, the data replacement circuit 344 replaces the control inputs Sp_1 through Sp_N for respectively controlling the multiple current sources 310_1 through 310_N with predetermined values specified for the respective semiconductor light sources. Specifically, the input control Sp is set to "H" for each semiconductor light source 102 to be turned on in the abnormal state. On the other hand, for each semiconductor light source 102 to be turned off in the abnormal state, the input control Sp is set to "L".

Figure 28A:
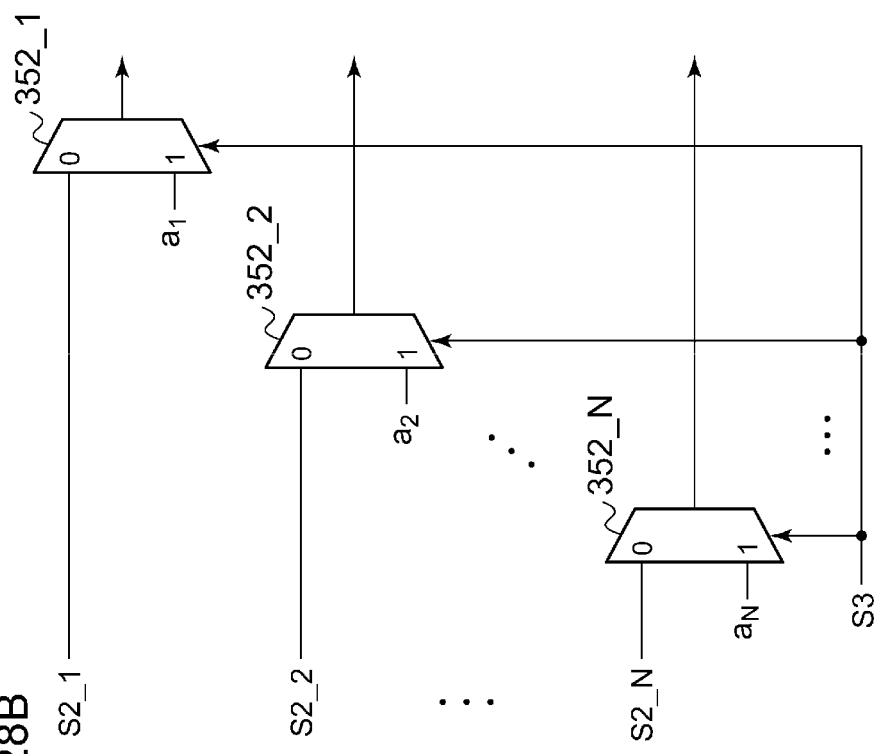
FIGS. 28A and 28B are circuit diagrams each showing an example configuration of a data replacement circuit.
Figure 28B:
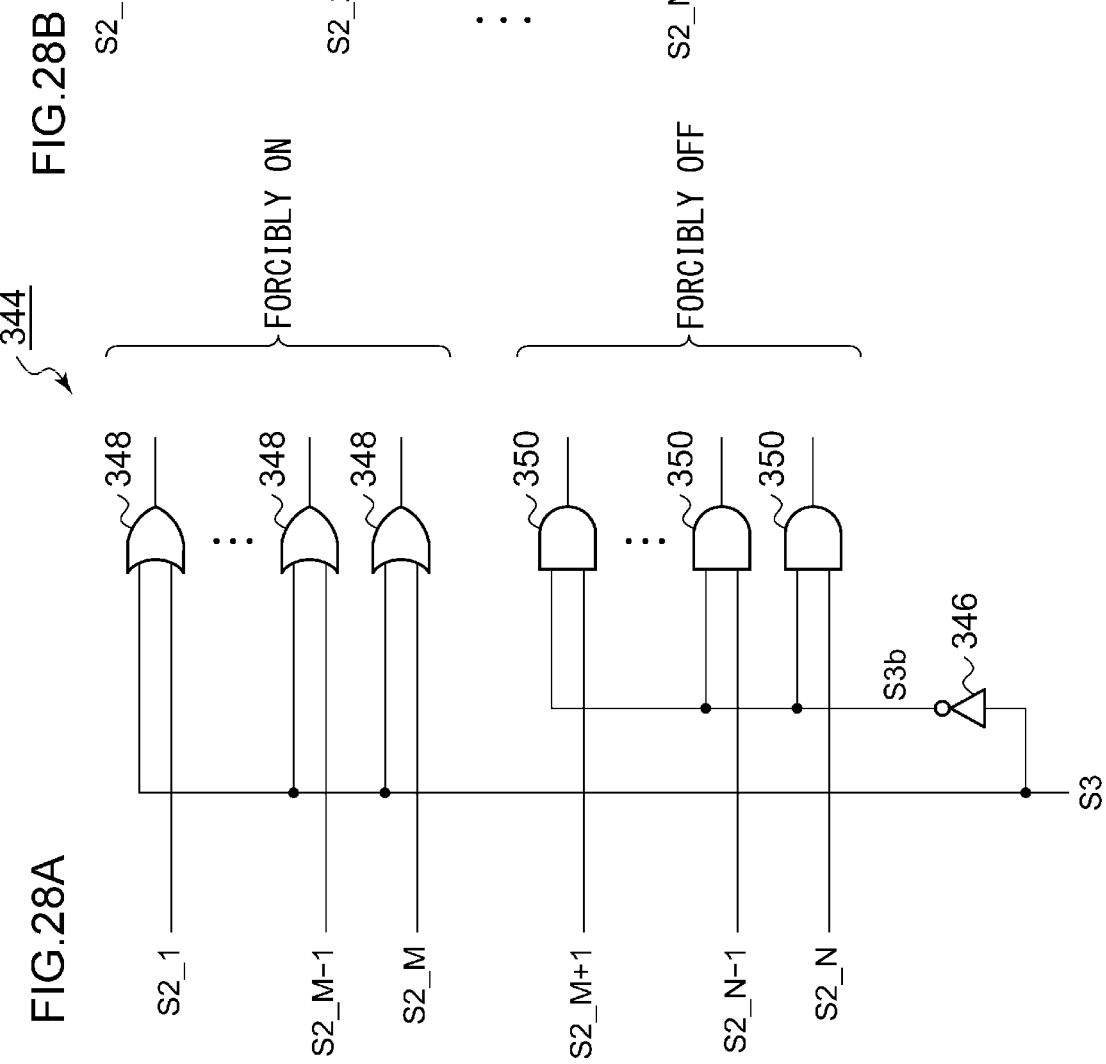

FIGS. 28A and 28B are circuit diagrams each showing an example configuration of the data replacement circuit 344. The data replacement circuit 344 shown in FIG. 28A includes an inverter 346, multiple first logic gates 348, and multiple second logic gates 350.

The inverter 346 inverts the abnormal state detection signal S3 so as to generate an inverted abnormal state detection signal S3b. The multiple first logic gates 348 respectively correspond to multiple current sources to be turned on in the abnormal state from among the multiple current sources 310. Each first logic gate 348_i receives the corresponding individual control signal S2_i and one (S3 in this example) from among the abnormal state detection signal S3 and the inverted abnormal state detection signal S3b, and supplies its output to the corresponding current source 310_i. In this example, the first logic gate 348 is configured as an OR gate.

The multiple second logic gates 350 correspond to multiple current sources to be turned off in the abnormal state from among the multiple current sources 310. Each second logic gate 350_j receives the corresponding individual control signal S2_j and the other one (S3b in this example) from among the abnormal state detection signal S3 and the inverted abnormal state detection signal S3b, and supplies its output to the corresponding current source 310_j. In this example, the second logic gate 350 is configured as an AND gate.

FIG. 28B shows another example configuration of the data replacement circuit 344. The data replacement circuit 344 includes multiple selectors 352_1 through 352_N that correspond to the multiple current sources 310_1 through 310_N. Each selector 352_# receives the corresponding individual control signal S2_# and a predetermined value a# as its input signals. The predetermined value a# is set to 1 for each of the current sources 310_i to be turned on in the abnormal state. On the other hand, for each of the current sources 310_j to be turned off in the abnormal state, the predetermined value a# is set to 0. When the abnormal state detection signal S3 is negated (0), the selector 352_# selects the individual control signal S2_#. Conversely, when the abnormal state detection signal S3 is asserted (1), the selector 352_# selects the predetermined value a#. Such an arrangement shown in FIG. 28B requires memory for storing the predetermined values a1 through a#. However, such an arrangement has an advantage of allowing the light distribution pattern to be generated in the abnormal state to be changed according to the value stored in the memory. In contrast, an arrangement shown in FIG. 28A has no function of changing the light distribution pattern to be generated in the abnormal state. However, such an arrangement does not require memory, thereby allowing the circuit area to be reduced.

Figure 29:
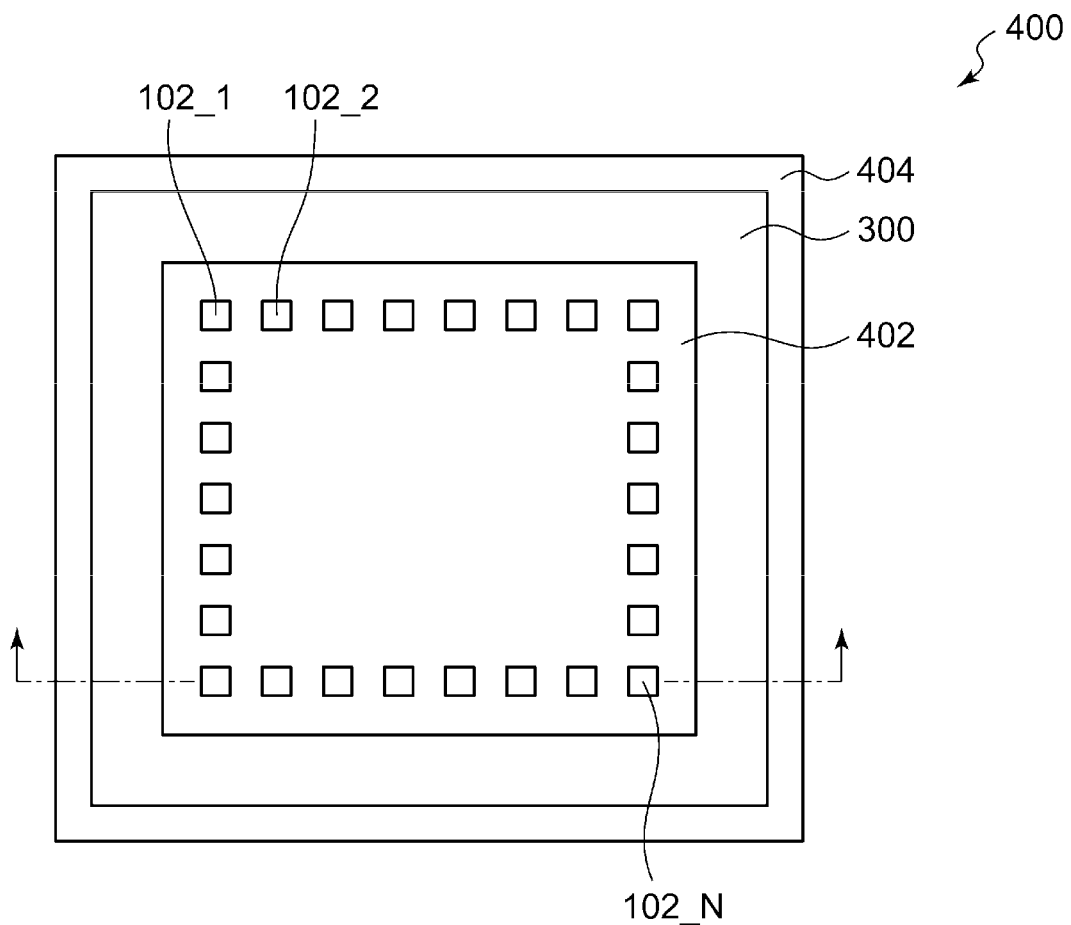
FIG. 29 shows a plan view and a cross-sectional view of the integrated-driver light source.
Figure 29:
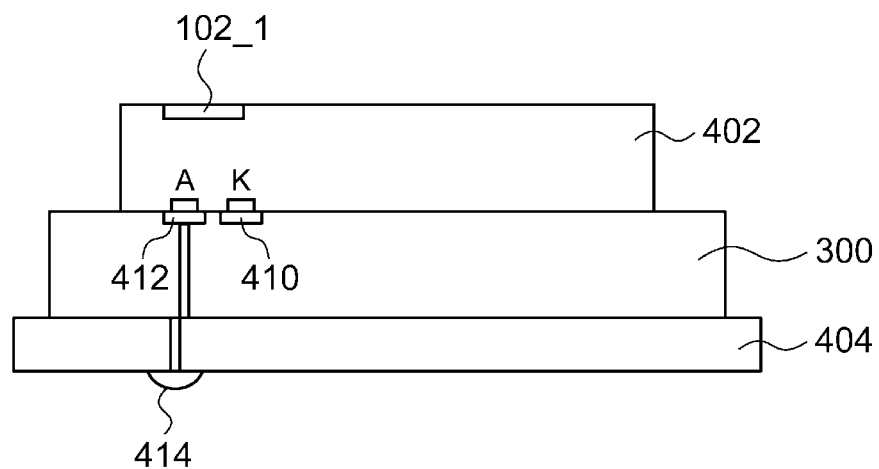

FIG. 29 shows a plan view and a cross-sectional view of the integrated-driver light source 400. The multiple semiconductor light sources 102 are formed in a matrix on the front face of the semiconductor chip 402 (LED chip in FIG. 24). The back face of the semiconductor chip 402 is provided with pairs of back-face electrodes A and K that each correspond to a pair of an anode electrode and a cathode electrode of each of the multiple semiconductor light sources 102. In this drawing, only a single connection relation is shown for the semiconductor light source 102_1.

The semiconductor chip 402 and the current driver IC 300 are mechanically joined and electrically coupled. The front face of the current driver IC 300 is provided with front-face electrodes 410 to be respectively coupled to the cathode electrodes K of the multiple semiconductor light sources 102 and front-face electrodes 412 to be respectively coupled to the anode electrodes A of the multiple semiconductor light sources 102. Each front-face electrode 412 is coupled to a corresponding bump (or pad) 414 provided to a package substrate configured as a back face of the current driver IC 300. Also, an unshown interposer may be arranged between the semiconductor chip 402 and the current driver IC 300.

The kind of the package of the integrated-driver light source 400 is not restricted in particular. As the package of the integrated-driver light source 400, a Ball Grid Array (BAG), Pin Grid Array (PGA), Land Grid Array (LGA), Quad Flat Package (QFP), or the like, may be employed.

Lastly, description will be made regarding modifications thereof.

Modification 3.1

Figure 30:
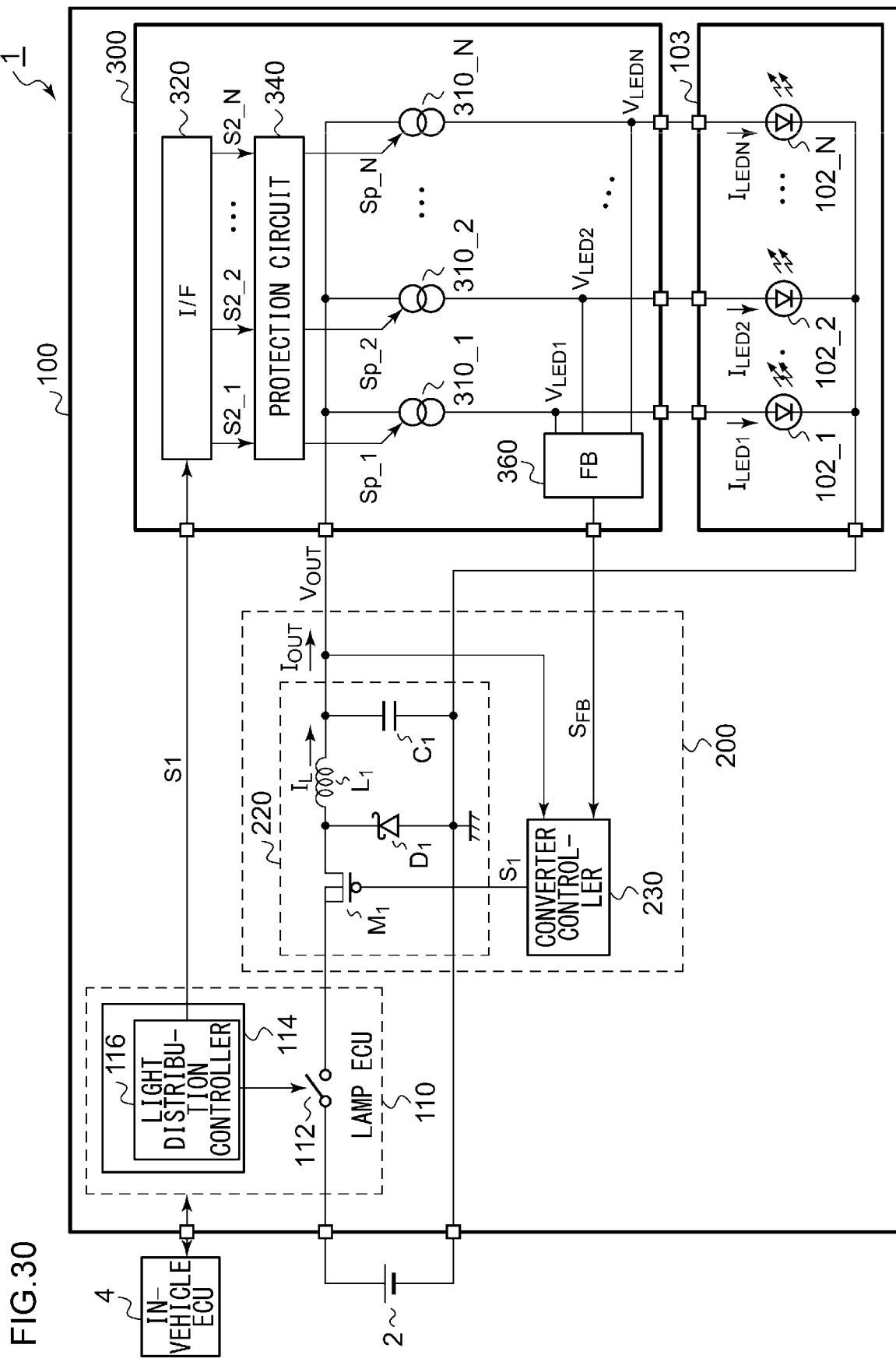
FIG. 30 is a circuit diagram showing the automotive lamp according to a modification 3.1.

Description has been made in the embodiment 3 regarding an arrangement in which the current source 310 is configured as a sink circuit, and is coupled to the cathode of the corresponding semiconductor light source 102. However, the present disclosure is not restricted to such an arrangement. FIG. 30 is a circuit diagram showing an automotive lamp 100 according to a modification 3.1. In this modification, the cathodes of the semiconductor light sources 102 are coupled so as to form a common cathode. Furthermore, the current sources 310 configured as source circuits are coupled to the anode sides of the corresponding semiconductor light sources 102. In this example, the difference between $V_{OUT}$ and $V_{LED\#}$ matches the voltage across the current source 310_#. Accordingly, in a case in which the feedback circuit 360 employs a ripple control method, when the highest voltage from among the anode voltages $V_{LED1}$ through $V_{LEDN}$ reaches a threshold voltage $V_{TH}$ (=$V_{OUT}$−$V_{MIN}$), the feedback signal $S_{FB}$ may be asserted. Here, $V_{MIN}$ represents a minimum value of the voltage across the current source 310 which enables the operation of the current source 310. Also, the converter controller 230 may turn on the switching transistor $M_1$ in response to assertion of the feedback signal $S_{FB}$.

Modification 3.2

Description has been made in the embodiment 3 regarding an arrangement in which the switching transistor $M_1$ is configured as a P-channel MOSFET. Also, the switching transistor $M_1$ may be configured as an N-channel MOSFET. In this case, a bootstrap circuit may be provided as an additional circuit. Instead of such a MOSFET, an Insulated Gate Bipolar Transistor (IGBT) or a bipolar transistor may be employed.

Modification 3.3

Description has been made in the embodiment 3 regarding an arrangement in which the logic circuit is configured as a positive logic system. However, the present disclosure is not restricted in particular. Also, a part of or the entire configuration of the logic circuit may be configured as a negative logic system.

Modification 3.4

The configuration of the current source 310 is not restricted to such an arrangement employing a current mirror circuit. Also, various kinds of known configurations may be employed.

Embodiment 4

Figure 31:
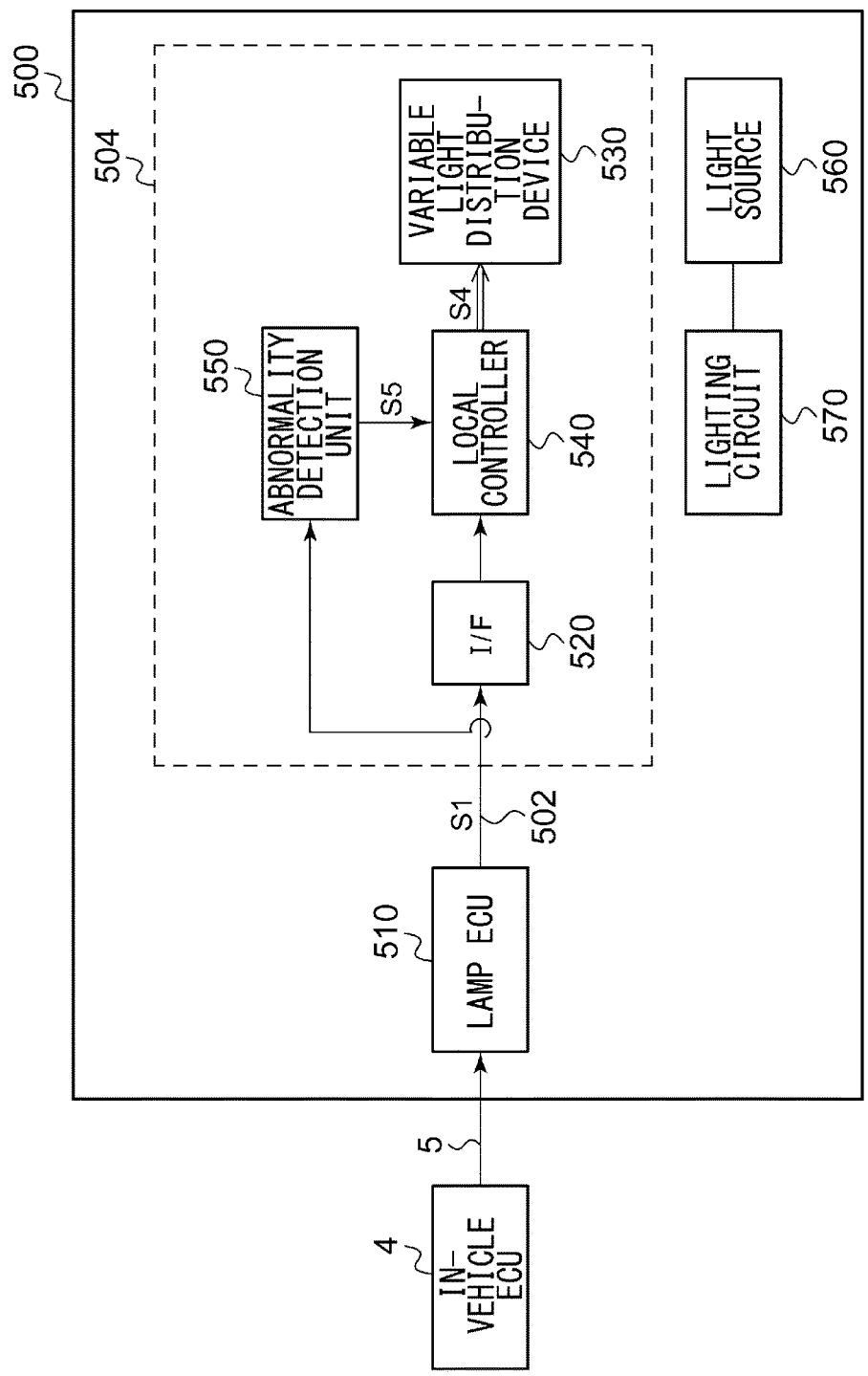
FIG. 31 is a block diagram showing an automotive lamp according to an embodiment 4.

FIG. 31 is a block diagram showing an automotive lamp 500 according to an embodiment 4. A lighting circuit 570 turns on a light source 560. A variable light distribution device 530 includes multiple elements that can be controlled independently. The light distribution pattern is generated according to a state of the multiple controllable elements. For example, the variable light distribution device 530 is configured as a Digital Mirror Device (DMD) that reflects the output light of the light source 560 or multiple bypass switches.

A lamp ECU 510 is configured as a higher-level controller that controls the light distribution pattern based on a control signal received from the in-vehicle ECU 4 via the communication line 5 and various kinds of information.

A local controller 540 and the variable light distribution device 530 are mounted on a single substrate 504. An interface circuit 520 is coupled to the lamp ECU 510 via a communication line 502. The interface circuit 520 receives the control signal S1 that indicates the light distribution pattern. The local controller 540 controls the variable light distribution device 530 based on the control signal S1 received by the interface circuit 520. The local controller 540 may have a decoder function of converting the control signal S1 received from the lamp ECU 510 into a control signal S4 for controlling the variable light distribution device 530. For example, the control signal S4 may include multiple individual control signals that indicate the respective states of the multiple controllable elements that form the variable light distribution device 530.

An abnormal state detection unit 550 monitors communication between the lamp ECU 510 and the interface circuit 520, and detects an abnormal state based on the monitoring results. The automotive lamp 500 is configured such that, when an abnormal state has been detected by the abnormal state detection unit 550, a predetermined pattern is forcibly set for the variable light distribution device 530.

Upon detecting an abnormal state, the abnormal state detection unit 550 asserts an abnormal state detection signal S5. For example, when there is no change in the control signal S1 transmitted via the communication line 502 for a predetermined period of time, the abnormal state detection unit 550 may judge that an abnormal state has occurred. In response to the assertion of the abnormal state detection signal S5, the local controller 540 sets the multiple individual control signals S2 to a set of predetermined values.

The interface circuit 520, the local controller 540, and the abnormal state detection unit 550 may be configured as a single microcontroller. Also, the interface circuit 520, the local controller 540, and the abnormal state detection unit 550 may be configured as a combination of multiple hardware components.

The embodiment 3 can be regarded as a form of the embodiment 4, and there is the following correspondence between them. Specifically, the interface circuit 320 shown in FIG. 24 corresponds to the interface circuit 520 and the local controller 540 shown in FIG. 31. Furthermore, the multiple current sources 310_1 through 310_N (or the multiple dimming switches 316 included in the current sources 310_1 through 310_M) shown in FIG. 24 correspond to the variable light distribution device 530 shown in FIG. 31. Furthermore, the abnormal state detection circuit 342 shown in FIG. 27 corresponds to the abnormal state detection unit 550 shown in FIG. 31. The data replacement circuit 344 shown in FIG. 27 corresponds to a part of the local controller 540 shown in FIG. 31.

Modification 4.1

Figure 32:
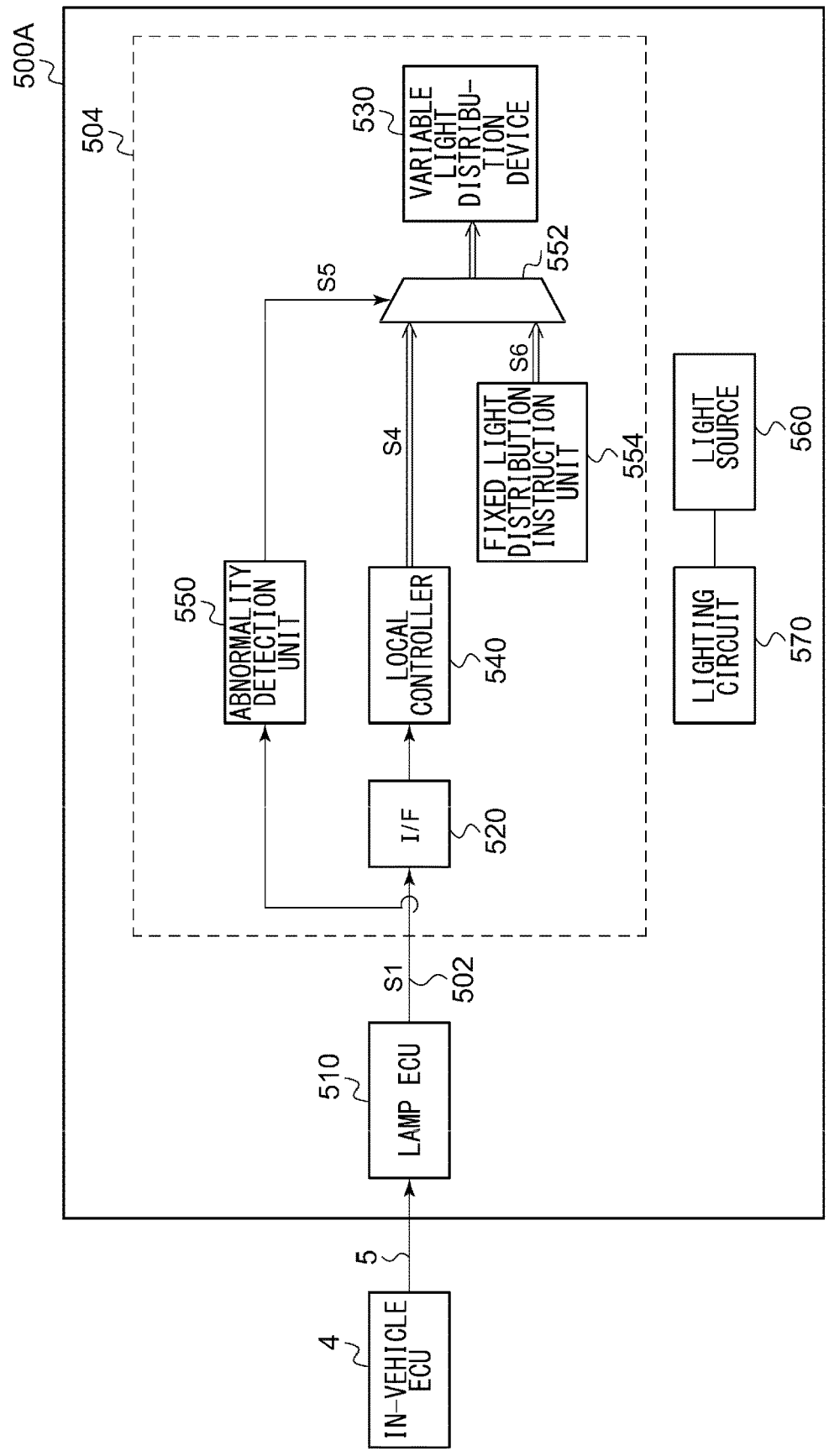
FIG. 32 is a block diagram showing the automotive lamp according to a modification 4.1.

FIG. 32 is a block diagram showing an automotive lamp 500A according to a modification 4.1. The automotive lamp 500A further includes a selector 552 and a fixed light distribution instruction unit 554 in addition to the components of the automotive lamp 500 shown in FIG. 31. The fixed light distribution instruction unit 554 generates a control signal S6 for determining a light distribution pattern to be used in an abnormal state. When the abnormal state detection signal S5 is negated, the selector 552 selects the control signal S4 generated by the local controller 540. When the abnormal state detection signal S5 is asserted, the selector 552 selects the control signal S6 generated by the fixed light distribution instruction unit 554.

Modification 4.2

Figure 33:
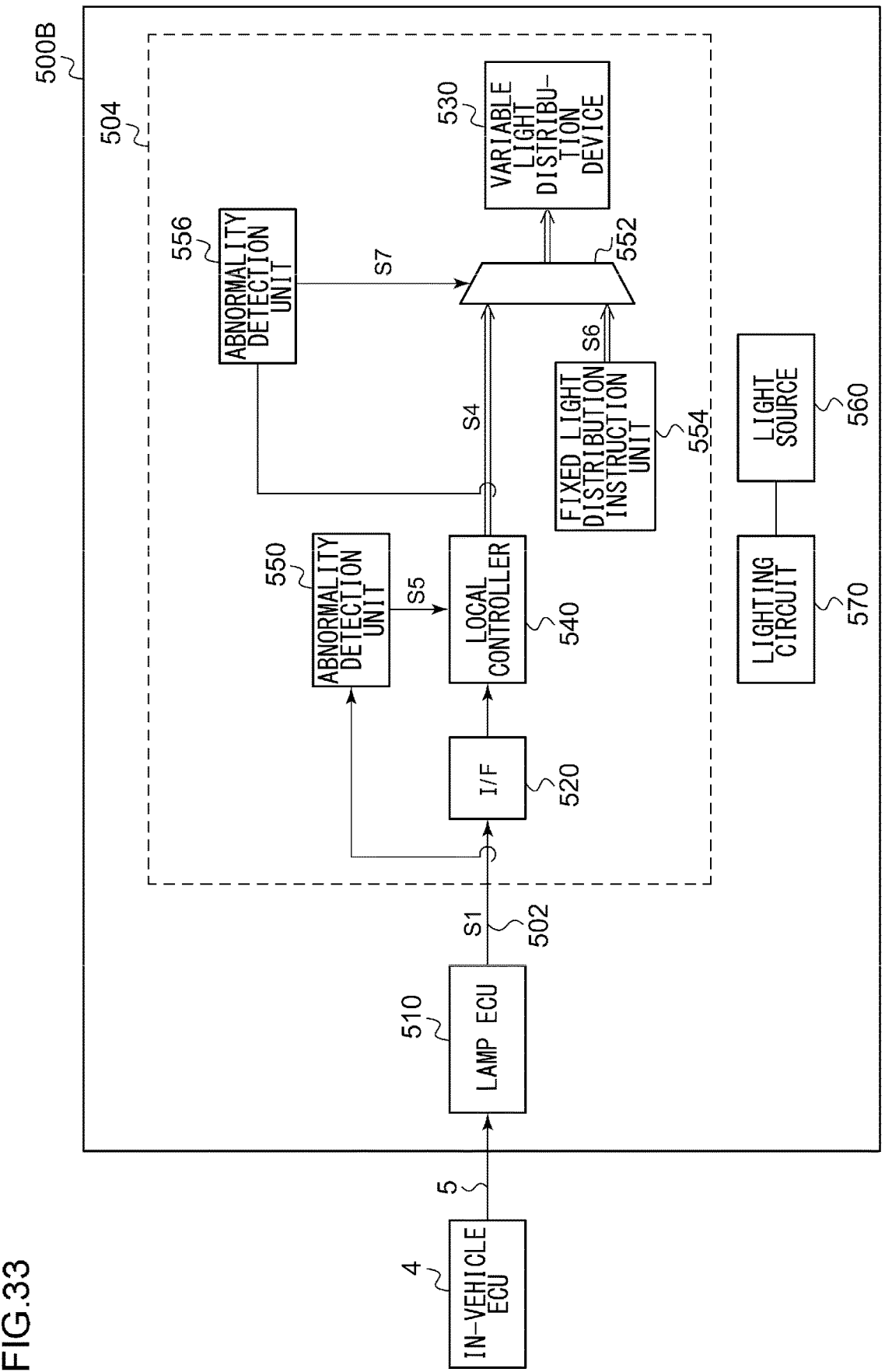
FIG. 33 is a block diagram showing the automotive lamp according to a modification 4.2.

FIG. 33 is a block diagram showing an automotive lamp 500B according to a modification 4.2. The automotive lamp 500B further includes a second abnormal state detection unit 556 in addition to the components included in the automotive lamp 500 shown in FIG. 32. The second abnormal state detection unit 556 monitors the output S4 of the local controller 540. Upon detecting an abnormal state, the second abnormal state detection unit 556 asserts an abnormal state detection signal S7.

In response to the assertion of the abnormal state detection signal S5, the local controller 540 replaces the control signal S4 with a signal to be used in the abnormal state.

In contrast, when the abnormal state detection signal S7 is asserted, this means that the local controller 540 is not operating normally, or that an abnormal state has occurred in the communication line between the local controller 540 and the variable light distribution device 530. In this state, such an arrangement is not able to supply the control signal S4 to be used in the abnormal state to the variable light distribution device 530. Accordingly, when the abnormal state detection signal S7 is asserted, the selector 552 selects the control signal S6 generated by the fixed light distribution instruction unit 554. This allows a suitable control signal to be supplied to the variable light distribution device 530.

While the preferred embodiments of the present disclosure have been described using specific terms, such description is for illustrative purposes only, and it is to be understood that changes and variations may be made without departing from the spirit or scope of the appended claims.

What is claimed is:

1. A lighting circuit structured to turn on and off a plurality of semiconductor light sources, the lighting circuit comprising:
   a plurality of current sources each of which is to be coupled in series with a corresponding one of the plurality of semiconductor light sources;
   a switching converter structured to supply a driving voltage across each of a plurality of series connection circuits each of which include one of the plurality of semiconductor light sources and one of the plurality of current sources; and
   a converter controller structured to control the switching converter based on a relation between a voltage across one of the plurality of current sources and a reference voltage having a positive correlation with temperature, wherein the converter controller monitors the temperature and increases the reference voltage as the monitored temperature increases,
   wherein the converter controller turns on a switching transistor of the switching converter when the voltage across a lowest-voltage one of the plurality of current sources decreases to the reference voltage,
   wherein the converter controller comprises:
      a constant voltage source structured to generate a constant voltage; and
      a correction current source structured to generate a correction current having a positive correlation with temperature,
      wherein the reference voltage matches a voltage obtained by adding the constant voltage to an offset voltage that is proportional to the correction current.

2. The lighting circuit according to claim 1, wherein the current source comprises a current mirror circuit.

3. The lighting circuit according to claim 1, wherein the correction current is generated using a temperature dependence of a forward voltage provided by a PN junction.

4. The lighting circuit according to claim 1, wherein the correction current source comprises:
   at least one diode and a resistor coupled in series; and
   a current mirror circuit structured to copy a current that flows through the diode, so as to generate the correction current.

5. The lighting circuit according to claim 1, wherein the plurality of semiconductor light sources are integrated on a first semiconductor chip,
   wherein the plurality of current sources are integrated on a second semiconductor chip,
   and wherein the first semiconductor chip and the second semiconductor chip are arranged such that surfaces thereof are coupled to each other so as to form a module housed in a single package.

6. An automotive lamp comprising the lighting circuit according to claim 1.

7. A lighting circuit structured to turn on and off a plurality of semiconductor light sources, the lighting circuit comprising:
   a plurality of current sources each of which is to be coupled in series with a corresponding one of the plurality of semiconductor light sources;
   a switching converter structured to supply a driving voltage across each of a plurality of series connection circuits each of which include one of the plurality of semiconductor light sources and one of the plurality of current sources; and
   a converter controller structured to control the switching converter based on a relation between a voltage across one of the plurality of current sources and a reference voltage having a positive correlation with temperature, wherein the converter controller monitors the temperature and increases the reference voltage as the monitored temperature increases,
   wherein the converter controller turns on a switching transistor of the switching converter when the voltage across a lowest-voltage one of the plurality of current sources decreases to the reference voltage,
   wherein the converter controller comprises:
      a voltage source; and
      a MOS transistor arranged on a path of an output current of the current source,
      and wherein the reference voltage corresponds to a drain-source voltage of the MOS transistor.

8. The lighting circuit according to claim 7, wherein the current source comprises a current mirror circuit.

9. The lighting circuit according to claim 7, wherein the converter controller comprises:
   a constant voltage source structured to generate a constant voltage; and
   a correction current source structured to generate a correction current having a positive correlation with temperature,
   wherein the reference voltage matches a voltage obtained by adding the constant voltage to an offset voltage that is proportional to the correction current.

10. The lighting circuit according to claim 9, wherein the correction current is generated using a temperature dependence of a forward voltage provided by a PN junction.

11. The lighting circuit according to claim 9, wherein the correction current source comprises:
   at least one diode and a resistor coupled in series; and
   a current mirror circuit structured to copy a current that flows through the diode, so as to generate the correction current.

12. The lighting circuit according to claim 7, wherein the plurality of semiconductor light sources are integrated on a first semiconductor chip,
   wherein the plurality of current sources are integrated on a second semiconductor chip,
   and wherein the first semiconductor chip and the second semiconductor chip are arranged such that surfaces thereof are coupled to each other so as to form a module housed in a single package.

13. An automotive lamp comprising the lighting circuit according to claim 7.

* * * * *